United States Patent
Irenze et al.

(10) Patent No.: US 8,259,907 B2
(45) Date of Patent: Sep. 4, 2012

(54) SYSTEM AND METHOD FOR ASSISTING FIELD COMMUNICATIONS TECHNICIANS IN REPAIRING COMMUNICATIONS LINES

(75) Inventors: Kimberly Irenze, Las Vegas, NV (US); Robert Scarboro, Wake Forest, NC (US)

(73) Assignee: CenturyLink Intellectual Property LLC, Denver, CO (US)

( * ) Notice: Subject to any disclaimer, the term of this patent is extended or adjusted under 35 U.S.C. 154(b) by 935 days.

(21) Appl. No.: 12/334,236

(22) Filed: Dec. 12, 2008

(65) Prior Publication Data

US 2010/0150319 A1    Jun. 17, 2010

(51) Int. Cl.
*H04M 1/24* (2006.01)
*H04M 3/08* (2006.01)
*H04M 3/22* (2006.01)

(52) U.S. Cl. ....... 379/21; 379/24; 379/27.01; 379/29.09

(58) Field of Classification Search ................. 379/1.01, 379/1.02, 1.03, 1.04, 21, 22, 22.03, 23, 27.01, 379/27.04, 29.01, 29.08, 24, 27.07, 29.09
See application file for complete search history.

(56) References Cited

U.S. PATENT DOCUMENTS

| | | | | |
|---|---|---|---|---|
| 5,511,108 A * | 4/1996 | Severt et al. | ..................... | 379/21 |
| 6,144,721 A * | 11/2000 | Stephens | .......................... | 379/21 |
| 6,763,108 B1 * | 7/2004 | Stephens | .................. | 379/399.01 |
| 6,950,497 B2 * | 9/2005 | Drury et al. | ................. | 379/14.01 |
| 7,149,285 B2 * | 12/2006 | Kennedy et al. | ........... | 379/27.01 |
| 2004/0066913 A1 * | 4/2004 | Kennedy et al. | ................. | 379/22 |
| 2007/0121792 A1 * | 5/2007 | Chong | .......................... | 379/1.01 |
| 2011/0292980 A1 * | 12/2011 | Cunningham et al. | ........ | 375/222 |

* cited by examiner

*Primary Examiner* — Binh Tieu
(74) *Attorney, Agent, or Firm* — Swanson & Bratschun, L.L.C.

(57) ABSTRACT

A system and method for assisting telephone service technicians in repairing communications lines may include storing test parameters for testing operation of a communications line. An operational parameter of communications over the communications line may be tested and a determination as to whether the operational parameter meets an operational criteria established by at least one of the test parameters may be made. The measured operational parameters and a test result indicator may be stored. If the operational parameter met the operational criteria, then an indication that the operational parameter passed a test may be made. Otherwise, (i) an indication that the operational parameter did not pass the test, (ii) possible causes for the operational parameter failing the test, and (iii) recommendations for correcting at least one possible problem that lead to the operational parameter not passing the test may be displayed for a technician.

20 Claims, 25 Drawing Sheets

Static IP

FIG. 9A

Select the Number of IPs
Selected: AHSM001IP
1- AHSM001IP
2- AHSM002IP
3- AHSM004IP
4- AHSM008IP
5- AHSM016IP

FIG. 9B

Enter Base IP Address
69.68.103.213
904a  904b  904c  904d
0  .  0  .  0  .  0

✗ Cancel   ✓ OK

FIG. 9C

Please Enter Subnet Mask
Selected: 255.255.255.128
1- 255.255.255.0
2- 255.255.255.128
3- 255.255.255.192
4- 255.255.255.224
5- 255.255.255.240

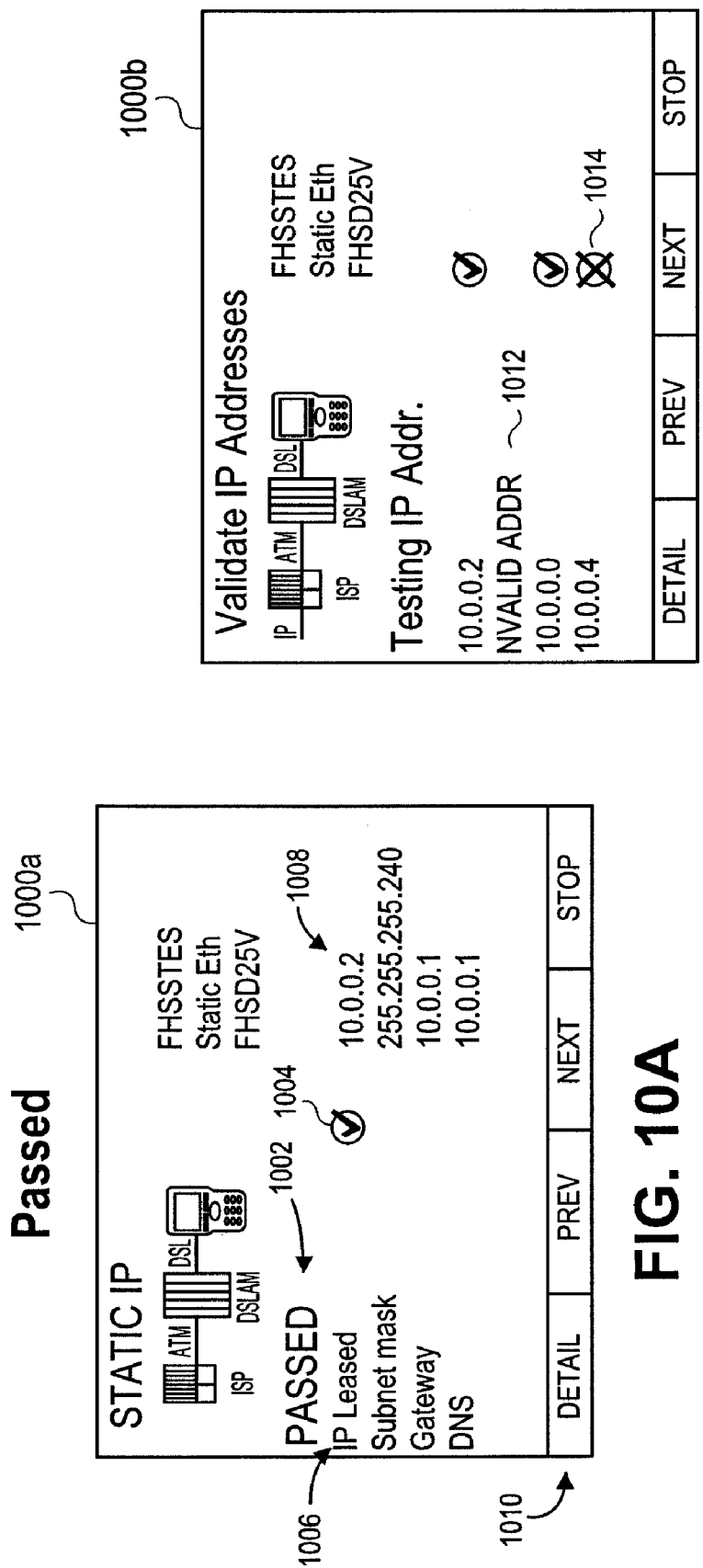

ADSL Tests

Passed

Show Time

|  | 1204 UP | DOWN |
|---|---|---|
| | | FHSDHCS |
| | | DHCP |
| | | FHSx15x (1 |
| Actual Rate | ✓ 448K | ✓ 1760K |
| Max Rate | ▬ 864K | ▬ 10472K |
| Capacity | ✓ 52% | ✓ 17% |
| Noise Margin | ✓ 24dB | ✓ 41.5dB |
| Attenuation | ✓ 0dB | ✓ 0dB |
| Est. Length | ▬ <1KFt | |

DETAIL | | | STOP

FIG. 12A

FAILED

Show Time

|  | UP | DOWN |
|---|---|---|
| | | FHSDHCS |
| | | DHCP |
| | | FHSx15x (1 |
| Actual Rate | ✓ 448K | ✗ 1472K |
| Max Rate | ▬ 864K | ▬ 11040K |
| Capacity | ✓ 52% | ▬ 13% |
| Noise Margin | ✓ 22dB | ✓ 41.5dB |
| Attenuation | ✓ 1dB | ✓ 0dB |
| Est. Length | ▬ <1KFt | |

DETAIL | | | STOP

FIG. 12B

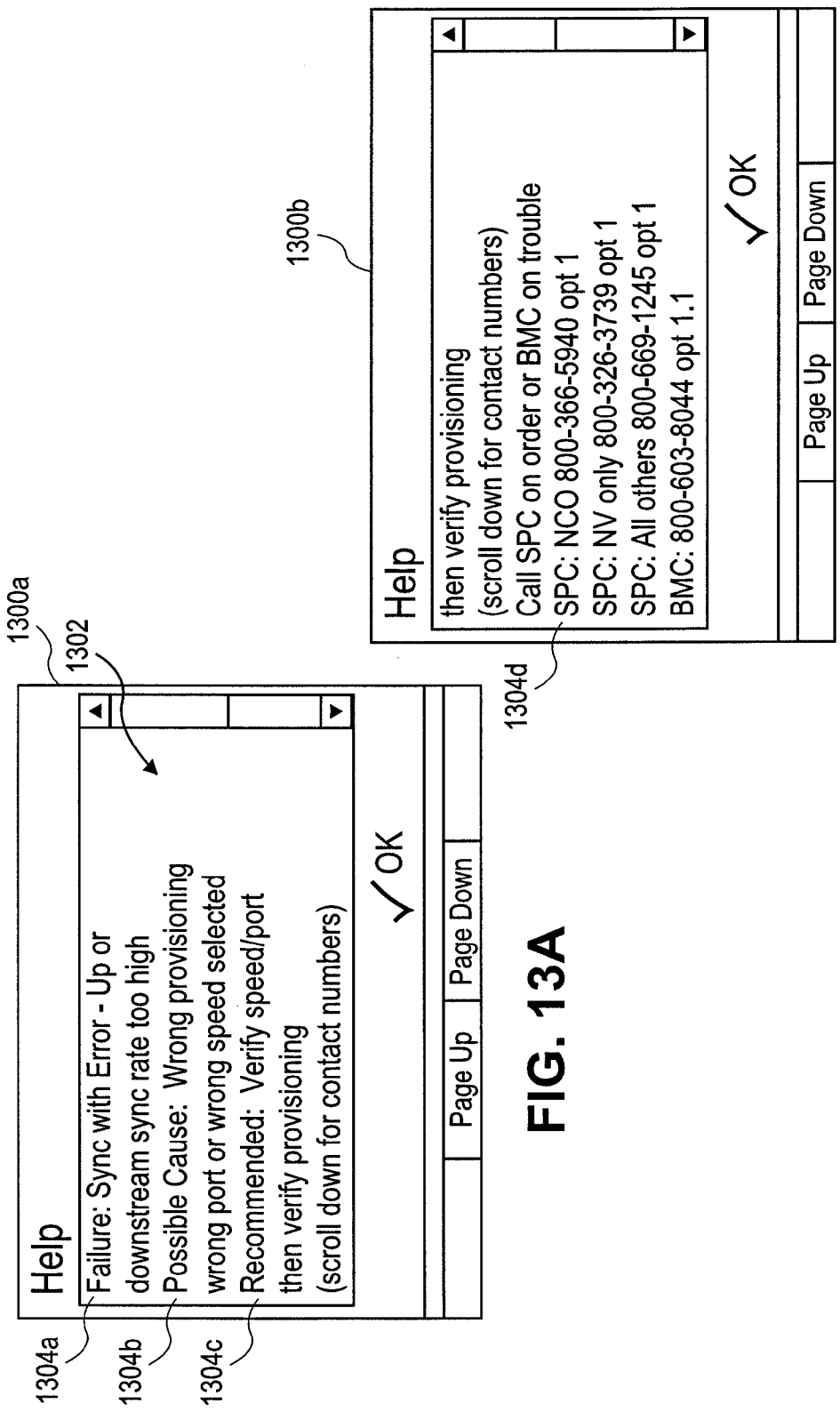

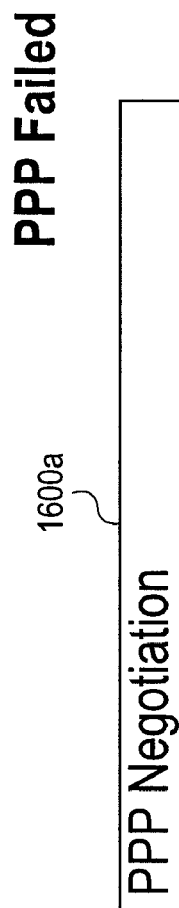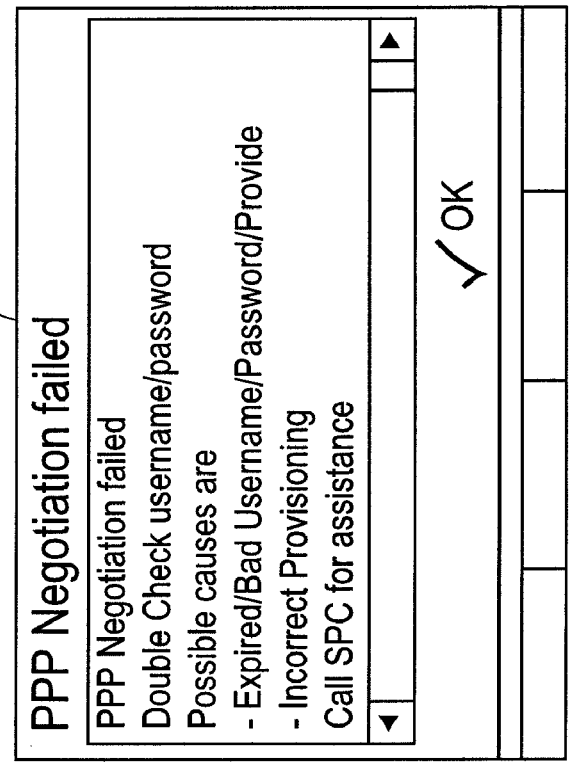
FIG. 16A
FIG. 16B

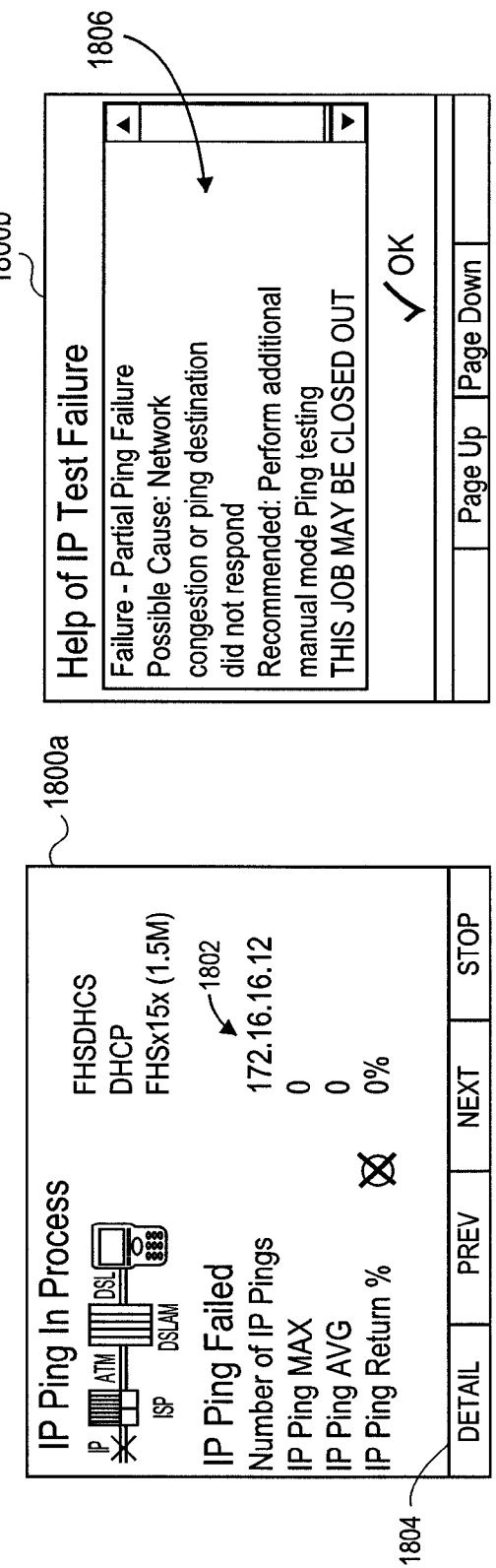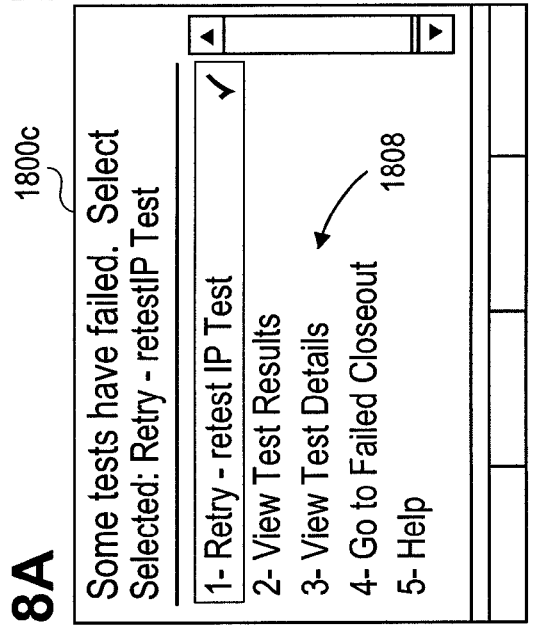
FIG. 18A
FIG. 18B
FIG. 18C

FTP Speed In Process

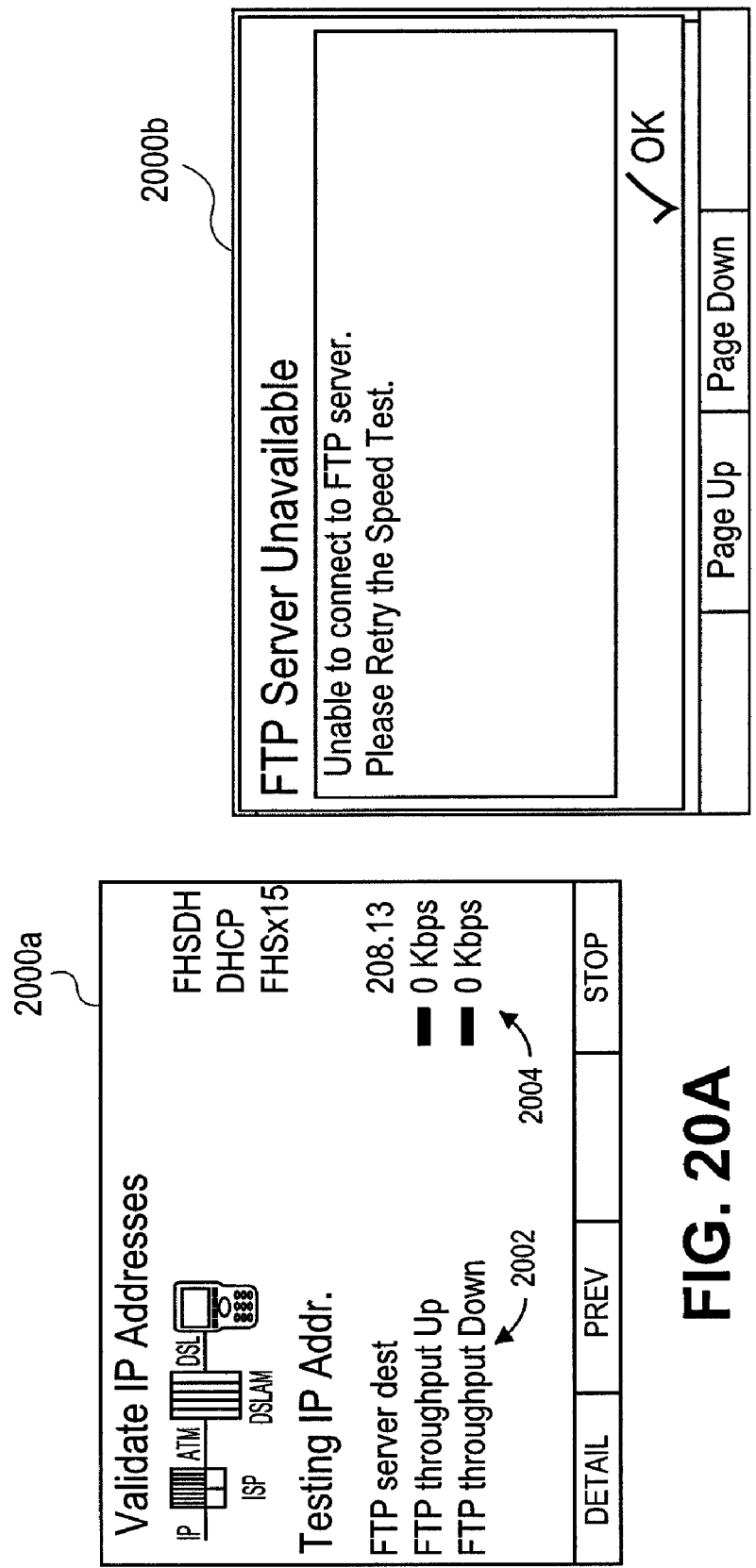

Summary Screen

SYSTEM AND METHOD FOR ASSISTING FIELD COMMUNICATIONS TECHNICIANS IN REPAIRING COMMUNICATIONS LINES

BACKGROUND

As communications technology has grown in recent years, the need for communications companies to repair and correct problems at customer premises has expanded, as well. Communications signals over telephone lines use many different communications protocols, such as asynchronous digital subscriber line (ADSL) communications protocol.

Telephone service technicians who are charged with correcting problems with communications signals being received at customer premises have had a difficult time keeping up with advances in communications technology. Communications signals these days are faster than ever. Test sets that display images or readings of the communications signals typically provide the technicians with test results that are often subject to interpretation, which makes determining whether a problem exists both difficult and subjective. Furthermore, as new communications technologies and services are delivered to customer premises, theoretical capabilities and actual operation are generally not consistent with one another. For example, a noise margin that should theoretically be sufficient for proper operation at a customer premise may be adequate for proper communications at one customer premise, which the same noise margin at another customer premise may be inadequate. As new communications technologies and equipment are rolled out, field technicians empirically learn whether communications parameters measured at customer premises are good or bad. Disseminating test information to thousands of field telephone service technicians and training the technicians is difficult and cost prohibitive.

Because of the difficulties with analyzing test measurements taken on communications lines at customer premises, training thousands of new and experienced technicians on new technologies and testing procedures based on empirical test results is challenging, inefficient, and expensive. As test procedures and test parameters may routinely change, often weekly for new communications protocols, the ability for managing and training telephone service technicians with each change can be overwhelming.

Furthermore, as techniques and processes for measuring communications signals at customer premises change, the telephone service technicians will have outdated test equipment, thereby requiring new or updated test equipment to be provided to the telephone service technicians. Providing such test equipment can be very expensive to purchase and distribute throughout the country to thousands of telephone service technicians.

SUMMARY

To overcome the problem of communications service providers having to train telephone service technicians ("technicians") each time new communications technologies are provided to customer residences and upgrade or provide new test equipment for testing new communications technologies or standards, the principles of the present invention provide for a handheld communications lines test set ("test set") provided to each telephone service technician that is capable of being remotely updated with communications line test parameters, test software, and firmware ("testing information"). In one embodiment, a server configured to collect test data from the test sets determines whether new testing information has been updated and available for download to the test set. In addition, the test sets may be configured to perform testing in a standardized manner by each of the test sets being updated to have the same testing information. The test sets may further be configured to provide on-the-job training for technicians by presenting the technicians with instructions upon failure of any test parameters. The test sets may perform testing on a telephone line by a technician interfacing the test set with the telephone line, either via a wire or wirelessly, and initiating testing. The testing initiation may be in response to a single button being selected and each test may display a "pass" or "fail" indicia, such as a check mark. If a test fails, the technician may select to view information about the failed test to receiving instructions for repairing the telephone line or contacting a service desk or service provisioning center to assist with repairing communications to the telephone line.

One embodiment of a system and method for assisting telephone service technicians in repairing communications lines may include a memory configured to store test parameters for testing operation of a communications line, an input/output (I/O) unit configured to communicate over the communications line with a network node, an electronic display, and a processing unit in communication with the memory, I/O unit, and electronic display. The processing unit may be configured to measure an operation parameter of communications over the communications line via the I/O unit. A determination as to whether the operational parameter meets an operational criteria established by at least one test parameter of the test parameters may be performed by the processing unit. The measured operational parameters and a test result indicator as to whether the operational parameters met the operational criteria may be stored in the memory. If the processing unit determined that the operational parameter met the operational criteria, then an indicator representative of the operational parameter passing a test of the operational parameter may be displayed on the electronic display. Otherwise, if the operational parameter did not meet the operational criteria, then (i) an indication that the operational parameter did not pass the test may be displayed on the electronic display, (ii) possible causes for the operational parameter failing the test may be displayed on the electronic display, and (iii) recommendations for correcting at least one possible problem that lead to the operational parameter not passing the test may be displayed on the electronic display.

BRIEF DESCRIPTION OF THE DRAWINGS

Illustrative embodiments of the present invention are described in detail below with reference to the attached drawing figures, which ate incorporated by reference herein and wherein:

FIGS. 9A-9C are screen shots of illustrative GUIs for a technician in performing a communications test using a test set;

FIGS. 10A and 10B are screen shots of illustrative GUIs showing test result information after performing a static IP ping test;

FIGS. 12A and 12B are screen shots of illustrative results in performing an asynchronous digital subscriber line test;

FIGS. 13A and 13B are screen shots of illustrative help screens displayed in response to a failure being detected by a test set;

FIGS. 16A and 16B are screen shots of an illustrative GUI showing test results in response to a data sync test failing;

FIGS. 18A-18C are screen shots of illustrative GUIs displaying test results in response to an IP ping hardware failure;

FIGS. 20A and 20B are screen shots of illustrative GUIs displaying results of an FTP test failure;

DETAILED DESCRIPTION OF THE DRAWINGS

Figure 1:
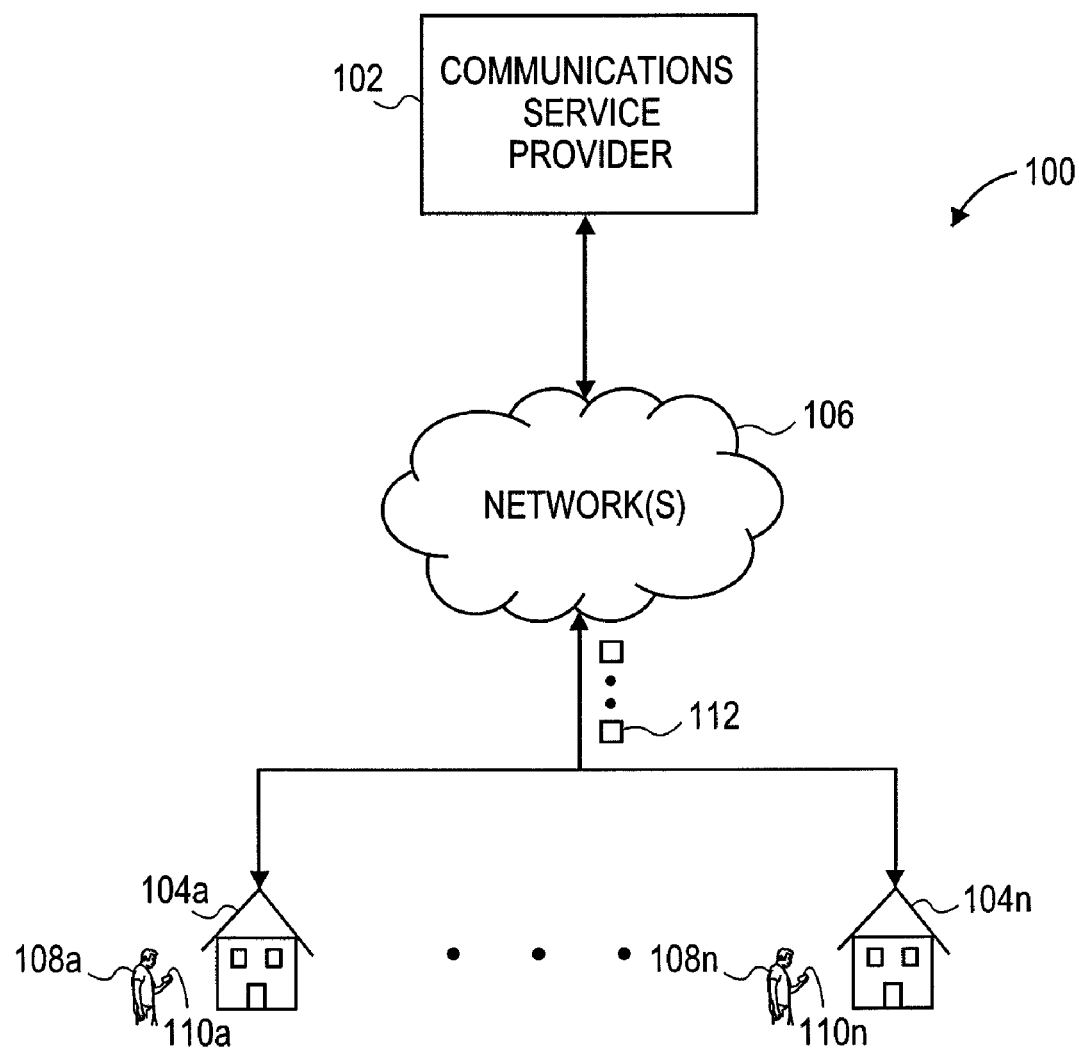
FIG. 1 is an illustration of an illustrative network environment in which telephone service technicians operate to repair telephone lines of customers.

With regard to FIG. 1, an illustrative network environment 100 is shown to include a communications service provider 102 that operates to provide communications services to customers at customer residences 104a-104n (collectively 104). The communications services may include traditional telephone services, WiFi communications services, digital subscriber line (DSL) communications services, high-speed Internet services, or any communications services available either currently or in the future. The communications services may be delivered to the customer residences 104 via one or more networks 106. The network(s) 106 may include the public switched telephone network (PSTN), Internet, mobile communications networks, satellite network, fiber optic network, combination network, or any other network, as understood in the art.

In providing communications services to customer residences 104, telephone service technicians 108a-108n (collectively 108) are available to visit each of the customer residences 104 to fix communications problems. As new communications services become available and legacy communications remain active, telephone service technicians 108 have to expand their knowledge base to diagnose communications problems in the field at the customer residences 104. In performing the diagnostic testing, the technicians 108 may utilize handset communications lines test sets 110a-110n (collectively 110), respectively. The test sets 110 may be configured to perform various communications tests, such as upload and download speed tests, by measuring communications signals 112 communicated over the network(s) 106.

Figure 2:
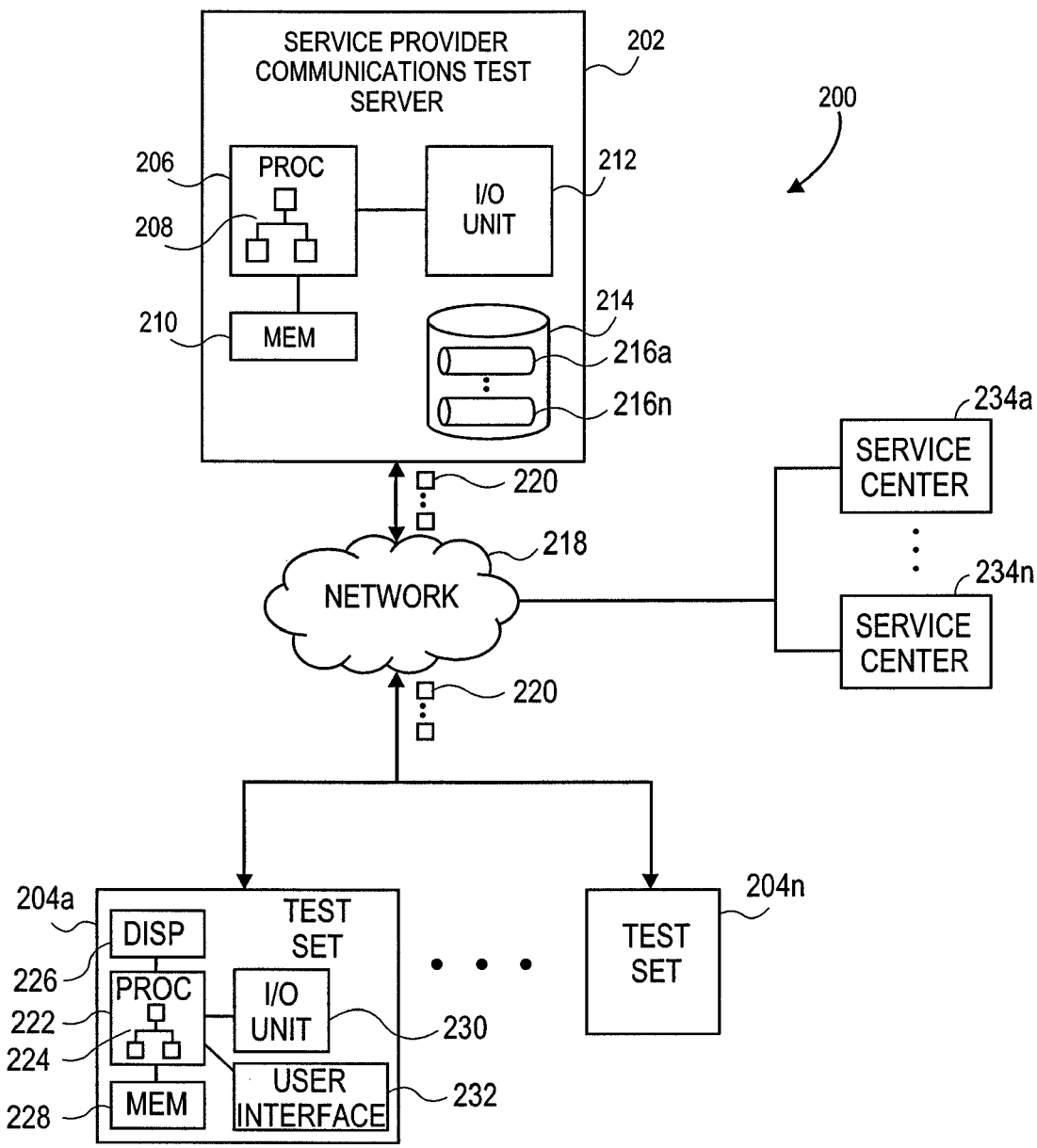
FIG. 2 is a block diagram of an illustrative network environment showing a service provider server in communication with test sets over a network for collecting test data from the test sets used to collect test data on communications lines.

With regard to FIG. 2, a network environment 200 is shown to include a service provider communications test server 202 that communicates with test sets 204a-204n (collectively 204) utilized by technicians. The test server 202 may include a processing unit 206 that executes software 208. The processing unit may be in communication with a memory 210 that operates to store data and software, input/output (I/O) unit 212 that is configured to communicate data and other information externally from the test server 202, and storage unit 214, which is configured to store one or more data repositories 216a-216n (collectively 216). The data repositories may store software, firmware, and test parameter updates for downloading to the test sets 204. In addition, the data repositories 216 may store test result data collected at customer premises. The data repositories 216 may be databases, as understood in the art.

The software 208 may be configured to cause the processing unit 206 to communicate with one or more test sets 204 via a network 218. In addition, the software 208 may process test results, monitor location of each test set, track versions of testing information on each test set, and generate reports for each data set stored in the data repositories 216.

In one embodiment, the network 218 is the Internet. Alternatively, the network 218 may include other networks, such as the public switched telephone network (PSTN), telecommunications network, such as a wireless communications network, or any other network, as understood in the art. The test server 202 may communicate data package 220 over the network 218 to the test sets 204 utilizing data packet communications techniques, as understood in the art. Alternatively, any other types of data communications may be performed between the test server 202 and test sets 204.

The test set 204a may include a processing unit 222 that executes software 224. The processing unit 222 may be in communication with an electronic display 226, memory 228, I/O unit 230, and user interface 232. The electronic display 226 may be configured to display GUIs that present test parameters as tests are performed. In one embodiment, the electronic display 226 is a touch screen that is responsive to a user's finger or stylus, as understood in the art. The memory 228 may be configured to store test or operational parameters for use in testing communications signals being delivered over the network 218 to a customer premise, as understood in the art. The memory 228 may also be utilized to store software 224 and test results collected by the test set 204*a* in performing one or more communications tests at one or more customer premise. The I/O unit 230 may be configured to communicate the data packet 220 over the network 218 with the test server 202. The I/O unit 230 may further be configured to utilize one or more communications protocols to enable the test set 204*a* to test the one or more communications protocols.

The user interface 232 may include a keypad, such as telephone dial keys 0-9 and additional keys that enable the user to interface with a graphical user interface, which may include menus or other GUI elements, to enable a technician using the test set 204*a* to perform testing at a customer premise. In one embodiment, the user interface 232 may include a key, button, or other hardware and/or software mechanism to initiate one or more communications tests without further interaction by the technician. The components shown in test set 204*a* may be the same or similar as those included in test sets 204*b*-204*n*. It should further be understood that the test sets 204 may be the same or different makes and models, but be configured to perform the same or similar testing of communications to and from customer premises.

The software 224 may be configured with multiple software modules that may be updated by the test server 202 in response to a test set 204*a* communicating test results after performing a communications test at a customer premise to the test server 202. By utilizing multiple modules, updating the software may be more efficient than having to update the entire software 224. In addition, the test set 204*a* may include firmware, which may be part of the software 224. The firmware, as understood in the art, is utilized to control operation or functionality of the test set 204*a* as opposed to being an application executed by the test set 204*a*. For example, the firmware may be utilized to control the user interface 232 and display 226.

Test parameters that are used to establish high and low values for communications tests that are performed by the test set 204*a* may also be updated by the test server 202 if it is determined that one or more test parameters have been updated by management of the test server 202. As new communications protocols and technologies are "rolled out" to customers of a communications service provider, test parameters may be empirically determined to allow customers to successfully communicate utilizing the communications protocols. The test parameters may be stored in the data repositories 216 and test results may also be stored in the data repositories 216. So as to standardize each of the test sets 204, the test server 202 may maintain the data records in the data repositories 216 that indicate that each test set 204 has been updated with software, firmware, and/or test parameters (i.e., testing information), thereby ensuring the each test set is operating with the most current testing information. In one embodiment, the testing information may be downloaded to each of the test sets 204 in response to the test sets 204 uploading test results data from one or more customer premise. In other words, while a test set is in communication with the test server 202, the test server 202 may update testing information on the test set.

Service centers 234*a*-234*n* (collectively 234) may be established by the communications service provider to assist technicians and customers with various testing and operational issues. The service centers 234 may be staffed with personnel who assist technicians in diagnosing and repairing communications lines at customer premises based on test results measured by the test sets 204 utilized by the technicians. The test sets 204 may be configured to display contact information of the service centers 234 in response to communications tests failing during testing at a customer premise. Depending on the particular communications test that fails, one or more of the service centers 234 that have personnel capable of responding to a technician to assist in correcting a problem may have contact information displayed to the technician so that the technician may call or otherwise communicate with the service center with the proper capabilities. Depending upon the failure, a technician or operator at the service centers 234 may correct a provisioning error associated with the customer or talk the technician through various troubleshooting corrections that may be performed by the technician in repairing the communications line at the customer premise.

With regard to FIGS. 3A-3C, an illustrative test set 300 is shown. The test set 300 may be an JDSU HST-3000 test set, which is a handheld test set that is weather resistant. It should be understood that other test sets may be utilized in accordance with the principles of the present invention. The test set 300 may include an electronic display 302 and user interface 304 that is capable of enabling the technician to place telephone calls or interact with a menu displayed on the electronic display 302. The test set 300 may include a serial connector 306, status LEDs 308, and other indicators that enable the test set to more readily present test results and other information to a technician, as understood in the art. A test key 310 may be available to the technician on the test set 300 to initiate testing of one or more communications tests rather than the technician having to select or request tests in succession.

As shown in FIG. 3B, the test set 300 may include a headset connector 312 that enables the technician to utilize a headset when placing telephone calls via the test set 300, USB connector 314 that enables the test set to be connected to a computing device for downloading or uploading test data, and an Ethernet connector 316 that enables the test set 300 to be connected to an Ethernet line at a customer premise. Other connectors may be available to connect to different types of communications lines. As shown in FIG. 3C, the test set 300 may include a pluggable test module 316 that includes module hardware and scalable software. Although software and firmware may be downloaded to the test set 300 via a network, hardware of the test set may be upgraded by simply replacing the pluggable test module 316.

Figure 4:
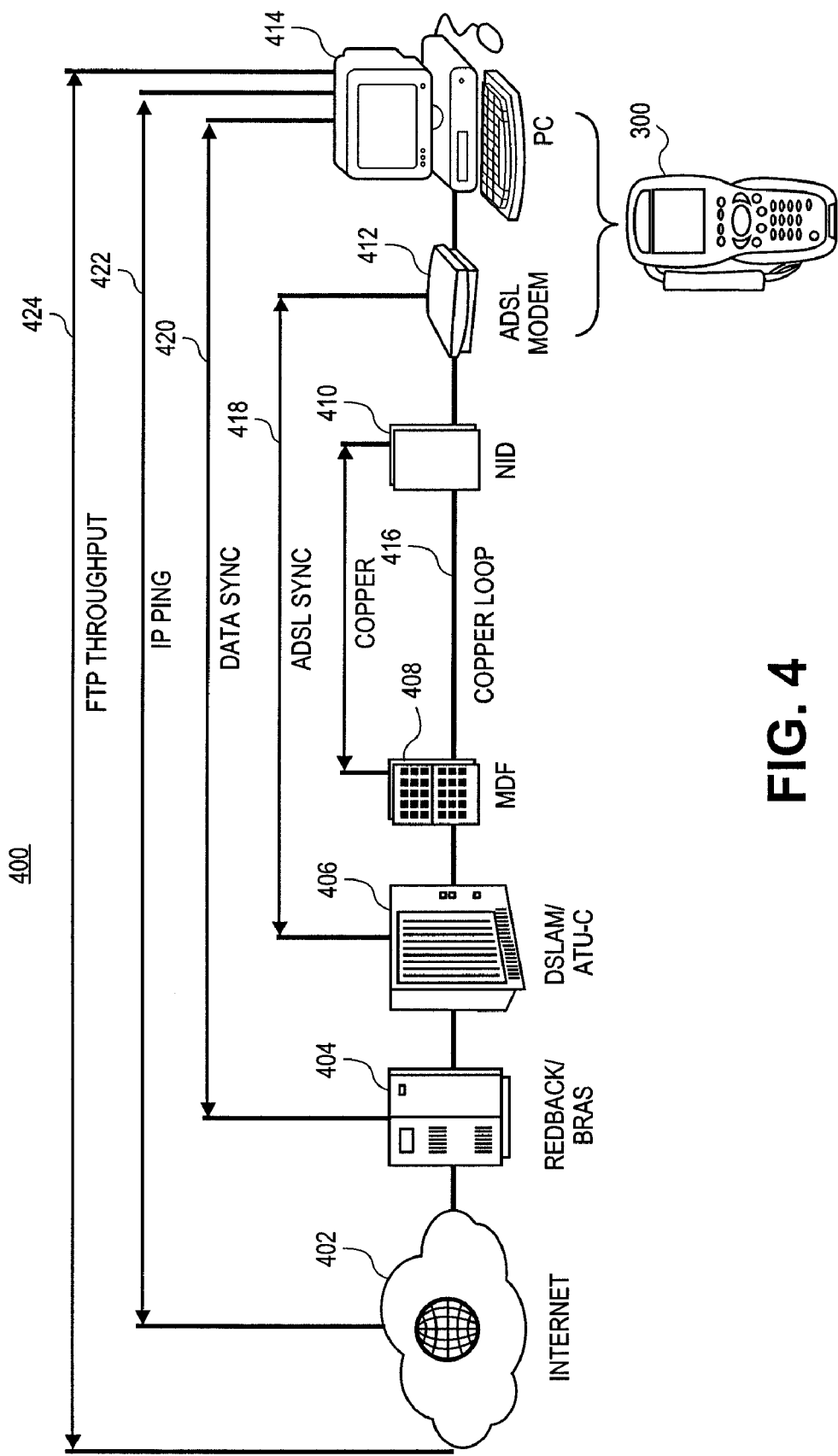
FIG. 4 is an illustration of an illustrative network environment of a customer residence at which a technician utilizes the test set of FIG. 3 to perform communications testing.

With regard to FIG. 4, a network environment 400 is shown to include the Internet 402, broadband remote access server (BRAS) 404, digital subscriber line access multiplexer (DSLAM) 406, main distribution frame (MDF) 408, network interface device (NID) 410, asynchronous digital subscriber line modem 412, and personal computer 414. The MDF 408 is a passive wiring device located in a central office that allows cable termination leading to an outside plant to voice switches, data devices, etc. As understood in the art, the network interface device 410, ADSL modem 412, and personal computer 414 are located at a customer premise. The MDF 408 and network interface device 410 typically communicate via a copper loop 416.

Figure 3:
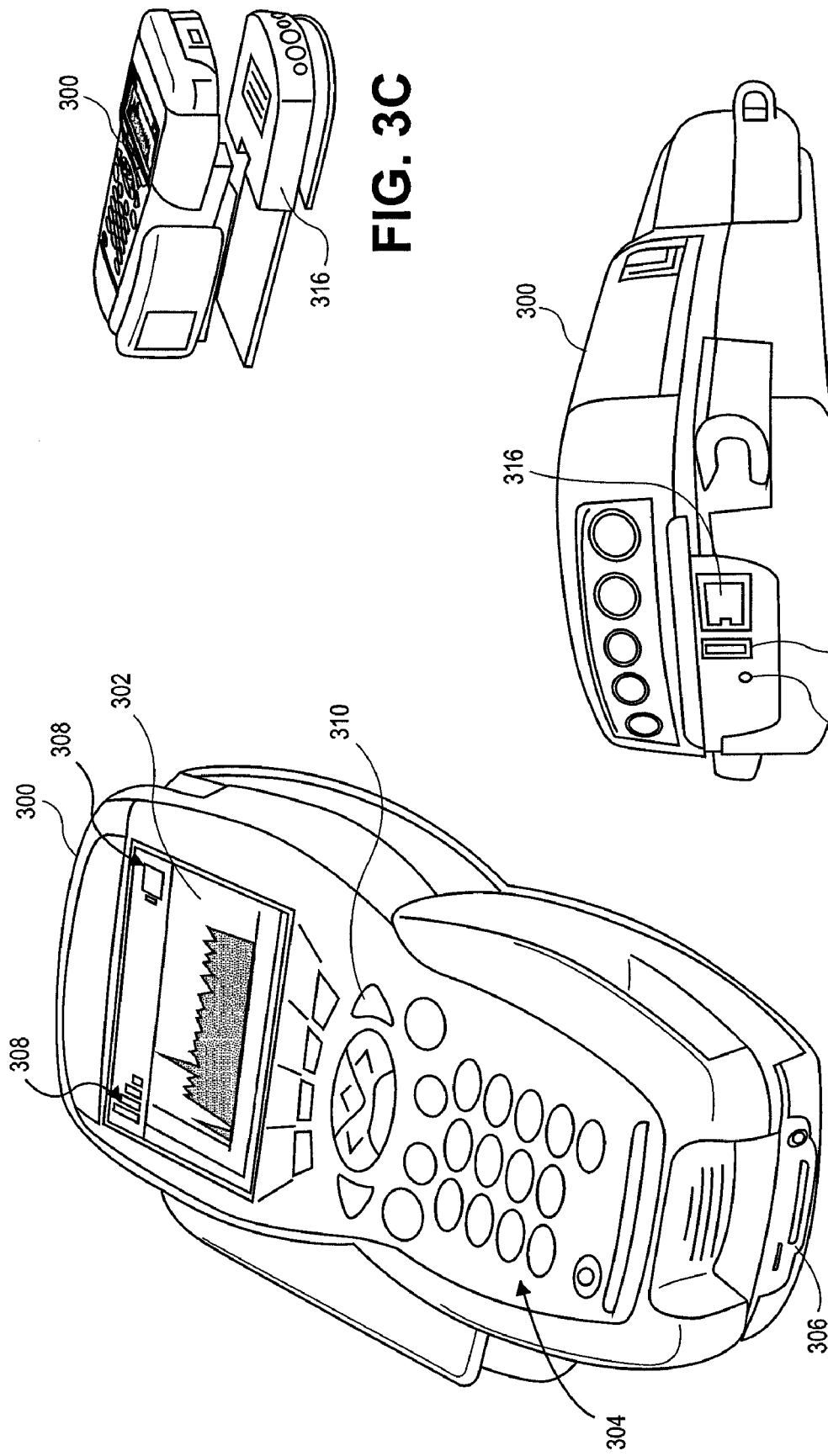
FIGS. 3A-3C (collectively FIG. 3) are images of an illustrative test set configured to perform communications testing in accordance with the principles of the present invention.

A technician who is sent to a customer premise may utilize the test set 300 of FIG. 3 to emulate the ADSL modem 412 and/or personal computer 414. In emulating these two devices, the test set 300 may perform a variety of tests, including an (i) ADSL sync test 418 that is performed between the DSLAM 406 and ADSL modem demarcation point at which the test set may be connected, (ii) data sync test 420, which is performed between the BRAS 404 and personal computer demarcation point at which the test set 300 may be connected, (iii) Internet protocol (IP) ping test 422 between the Internet and personal computer demarcation point to which the test set 300 may be connected, and (iv) file transfer protocol (FTP) throughput test 424, which is performed between a device on the other side of the Internet 402 and personal computer demarcation point to which the test set 300 may be connected. Each of these communications tests, including the ADSL sync test 418, data sync test 420, IP ping test 422, and FTP throughput test 424 may be utilized to diagnose operation of one or more layers of the open systems interconnection (OSI) model. The OSI model, as understood in the art, includes seven layers, including Layer 1 (physical layer), Layer 2 (data link layer), Layer 3 (network layer), Layer 4 (transport layer), Layer 5 (session layer), Layer 6 (presentation layer), and Layer 7 (application layer). One or more of the tests may be utilized to verify that each of the layers of the OSI model are properly functioning at the customer premise.

Figure 5:
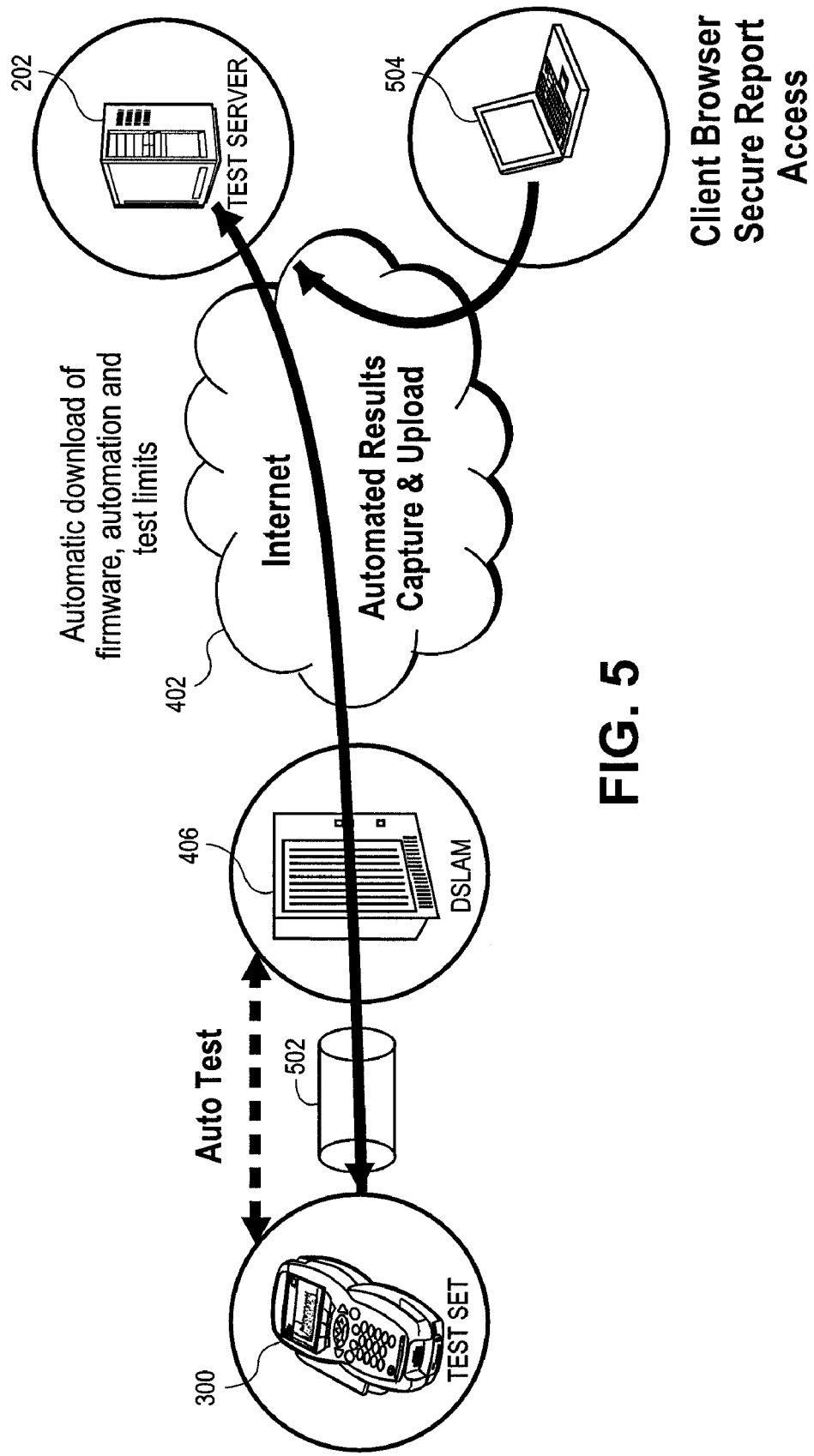
FIG. 5 is an illustration of an illustrative network environment in which a test set may be utilized to communicate test results to a communications service provider and download testing information to standardize the test sets.
Figure 6:
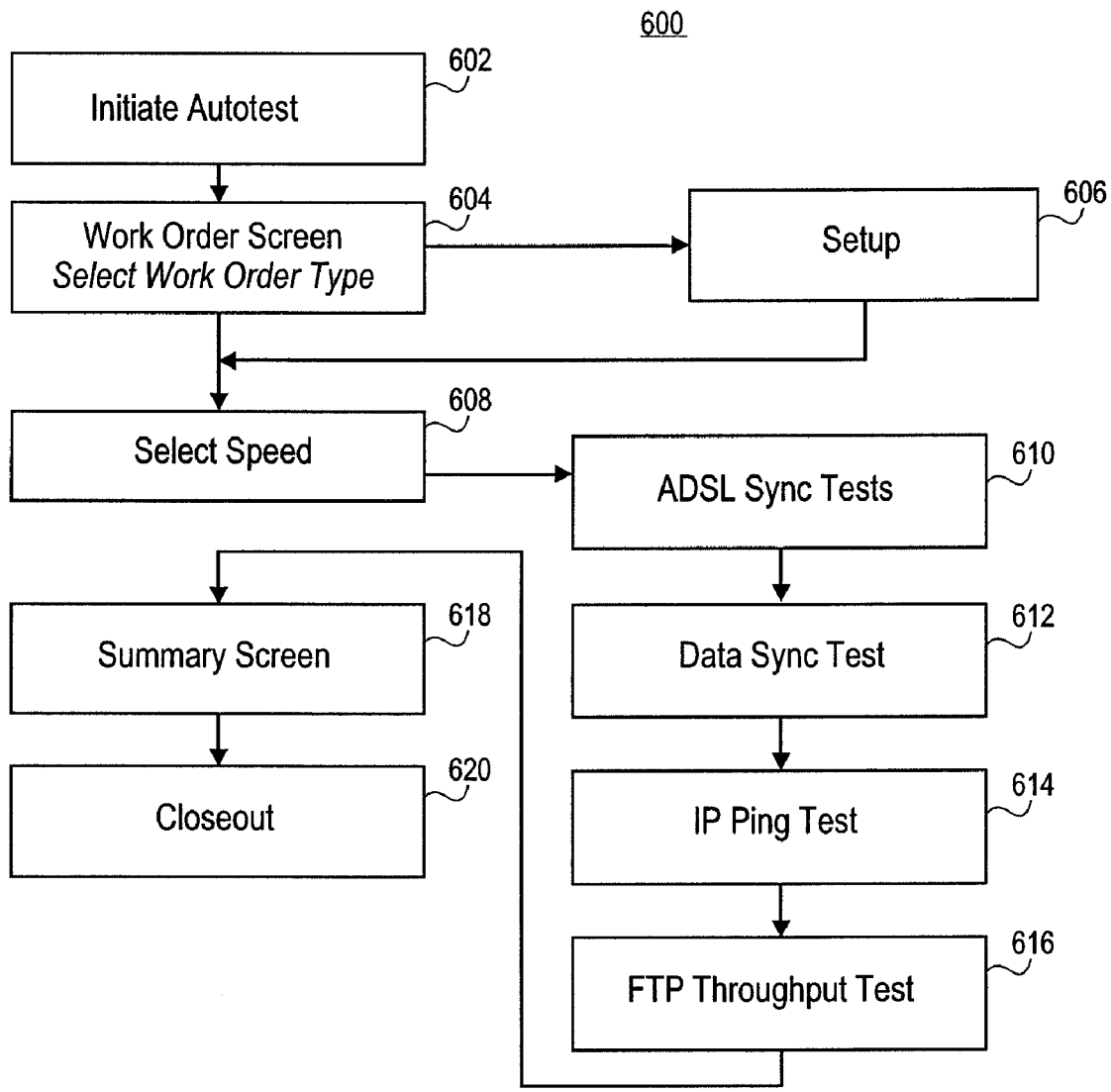
FIG. 6 is a flow diagram of an illustrative process for a technician in performing testing on communications lines using the test set of FIG. 3.

With regard to FIG. 5, the test set 300 (FIG. 3) may communicate with the DSLAM 406 (FIG. 4) to perform automatic testing over a communications path 502. The automatic testing may include performing an ADSL sync test 418, data sync test 420, IP ping test 422, and FTP throughput test 424, as described with regard to FIG. 4. Tests on other communications protocols, such as point-to-point protocol (PPP) and dynamic host configuration protocol (DHCP), may be performed by the test set 300. The following list in TABLE I is an illustrative set of communications tests that may be performed by the test set 300, as further described herein. The thresholds in the tests may be empirically determined except for signal quality (i.e., noise margin) where industry standard values may be used. The test automatically sets line mode and data configurations to define a single standard for 800 different combinations. In addition, the test performs validates 26 line/data parameters against pass/fail criteria to validate service.

TABLE I

1. Basic xDSL Line Configurations are set upon test start
   a. Trellis Coding set
   b. Echo cancellation set
   c. Coding gain set
2. Speed selection sets additional configurations
   a. xDSL line coding (i.e. DMT, T1.413)
   b. Maximum sync rate threshold (based on contract and ATM payload overhead)
   c. Minimum sync rate threshold (based on contract and ATM payload overhead)
   d. Line capacity threshold
3. Work type selection sets data encapsulations
   a. Data mode set (i.e. PPP over Ethernet, PPP over ATM, DHCP, IP over Ethernet, or IP over ATM)
   b. ATM VC set
   c. ATM header encapsulation set
4. Physical line test
   a. Showtime test (physical sync)
   b. Upstream test against thresholds
      i. Minimum actual rate
      ii. Maximum actual rate
      iii. Maximum rate
      iv. Capacity
      v. Noise Margin
      vi. Transmit power
   c. Downstream test against thresholds
      i. Minimum actual rate
      ii. Maximum actual rate
      iii. Maximum rate
      iv. Capacity
      v. Noise Margin
      vi. Transmit power
      vii. Estimated loop length
   d. Line error test against thresholds
      i. Local CRC (cyclical redundancy check) error counts
      ii. Remote CRC error counts
      iii. Local RS (Reed-Solomon) error counts
      iv. Remote RS error counts
5. Data test
   a. Data authentication test (i.e. username/password, DHCP, static entry)
   b. IP Ping test against thresholds
      i. Predefined packet size
      ii. Echo return from defined destination
      iii. Echo loss threshold
      iv. Echo average return threshold
6. Data throughput test against thresholds
   a. Timed FTP upload file (variable size based on work type)
   b. Timed FTP download file (variable size based on work type)

The test set 300 may upload the test result data to the test server 202 (FIG. 2) via the Internet 402 (FIG. 4). The test results may be communicated to the test server 202 for storage thereat. In response to the test server receiving the test results, the test server 202 may determine whether the test set 300 has been updated with new application software, firmware, and test parameters by checking with a database stored at the test server 202 or remotely to determine which version of the application software, firmware, and test parameters have been previously downloaded to the test set 300. If the test set 300 has not been updated with the newest testing information, then the test server 202 may initiate downloading any of the testing information to the test set 300. The uploading of test results and downloading of testing information may be performed automatically by the test set.

A computing device 504 may be utilized by a user at a communications service provider to access test results and update testing information. The computing device 504 may be configured to generate reports, such as tables and spreadsheets, to enable the user to easily view the test results and track locations of the test sets.

An illustrative process for performing communications testing using a handheld communications lines test set is provided. At step 602, a technician may initiate auto test by pressing a button on a user interface or otherwise selecting an auto test via a menu or other graphical user element on the electronic display. At step 604, a work order screen may be displayed for the technician to select a work order type. At step 604, the technician may perform a setup to ensure that the test set is properly set up for a particular work order that has been selected. The work order types may be selected via a menu system or otherwise on the test set based on a particular type of work order that has been assigned to the technician to be performed at a customer premise based on information from the customer about problems that exist when using a communications device, such as a computer or telephone (e.g., WiFi telephone). At step 608, the technician may select a speed of communications at which the customer is to receive communications based on a contract with the customer. For example, if the customer is paying for high speed DSL, then the communication speed at the customer premise is to be selected for high speed DSL.

The communications line testing begins at step 610, where an ADSL sync test is performed. At step 612, a data sync test is performed. At step 614, an IP ping test is performed. At step 616, an FTP throughput test is performed. Other tests may be performed to ensure that the customer is receiving communications as contracted with the communications service provider.

At step 618, after completing each of the communications tests, a summary screen may be displayed on the test set. The summary screen may be a listing of each of the communications tests that were performed and test results associated with each test. In addition, test parameters (e.g., high speed and low speed) may be displayed in association with each of the tests. Furthermore, the summary screen may show an indicator or other indicia for each of the tests that indicates a pass or fail of the test and enable the technician to select the indicator or indicia to display additional information associated with the test, including repair information, additional testing information, or contact information of a service center to discuss the test results with a technician at the service center. At step 620, the technician may close out the testing. At the close out, the test results may be automatically, semi-automatically, or manually uploaded to a test server for collection of the test results at the customer premise and determination as to whether updated software, firmware, or test parameters are to be downloaded to the test set.

Figure 7B:
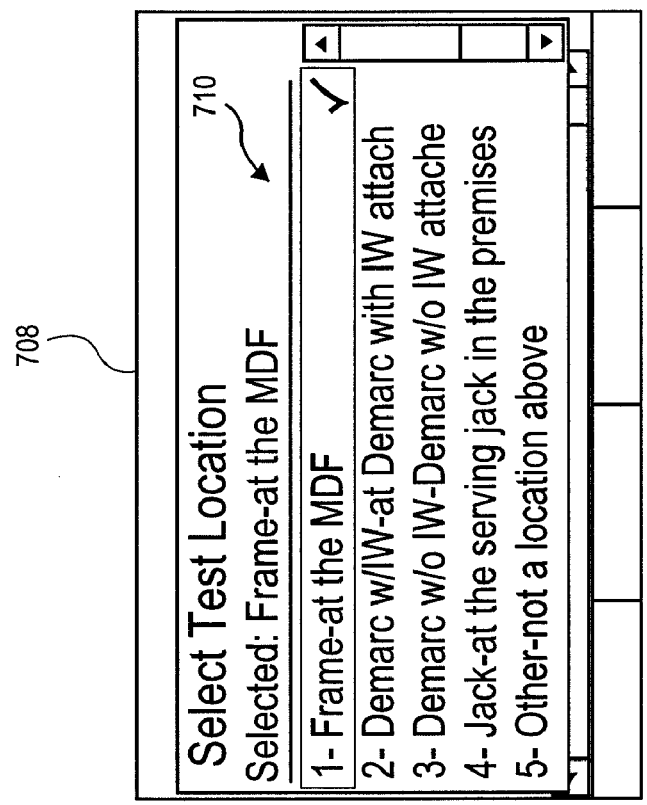
FIGS. 7A and 7B are screen shots of illustrative setup screens for a technician in performing a communications test at a customer residence or premise.
Figure 7A:
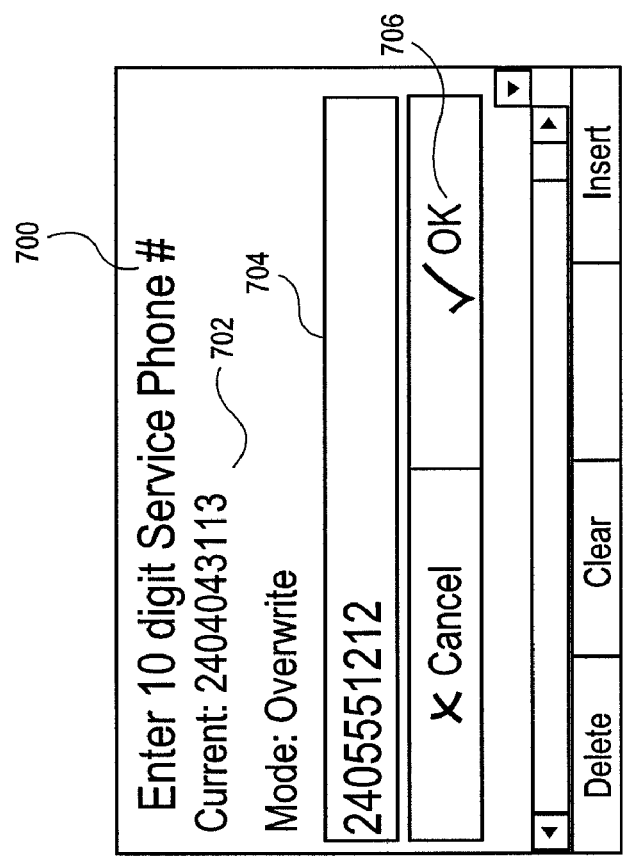

With regard to FIG. 7A, an illustrative graphical user interface 700 may be shown to enable a technician to enter a 10-digit telephone number being serviced at a customer premise. A current telephone number 702 may be displayed to be used as a default, where the current telephone number 702 is the last telephone number utilized by the test set based on a customer premise at which communications testing was being performed. If the test set is being used at a different customer premise having a different telephone number, then the technician may enter a different telephone number in a text entry field 704, and select an "OK" indicia 706 to overwrite the current telephone number 702 with the telephone number entered in the text entry field 704.

With regard to FIG. 7B, an illustrative graphical user interface 708 showing an illustrative menu 710 for a technician to select a test location at which the test set is to be connected. As shown, the menu 710 may include menu selections, including "frame—at the MDF," "demarc w/IW—at demarc with IW attached," "demarc w/o IW—demarc w/o IW attached," "jack—at the serving jack in the premises," "other—not a location above." The technician may scroll or otherwise select a menu item to indicate to the test set where the test set is connected so that proper testing may be performed at the customer premise. If the "other" menu selection is selected, then alternative test locations may be presented to the technician for selection.

Figure 8B:
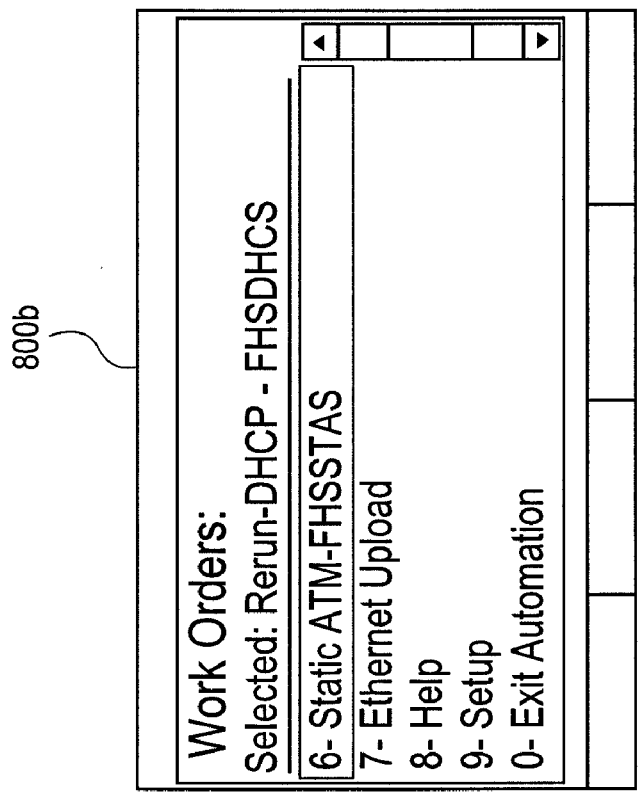
FIGS. 8A-8B are screen shots of an illustrative graphical user interface (GUIs) menu for a technician to select a work order to be performed at a customer premise.
Figure 8A:
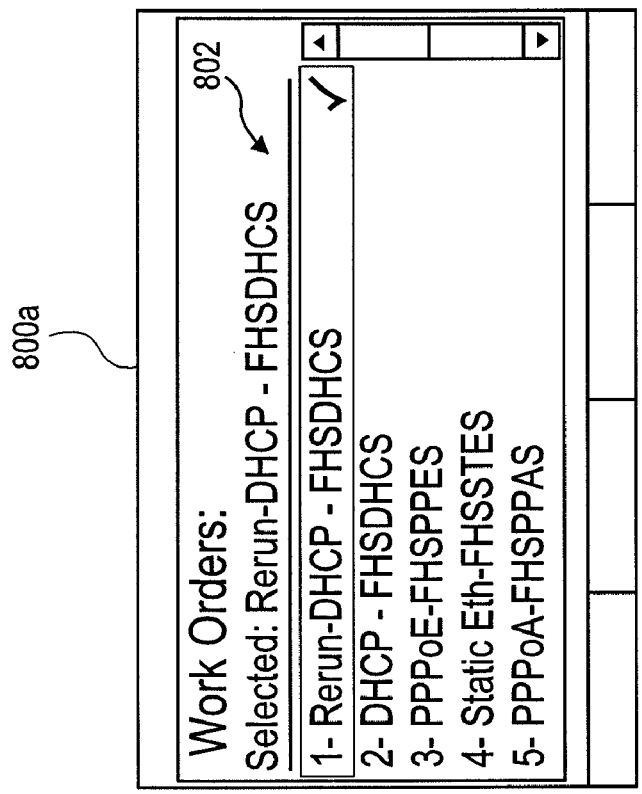

With regard to FIGS. 8A and 8B, illustrative graphic user interfaces 800*a* and 800*b*, respectively, are shown. In the GUIs 800*a* and 800*b*, an illustrative menu 802 for a technician to select a work order is displayed. The work orders may include a listing of testing options that a technician may select from to perform one or more work orders at a customer premise. The menu 802 may also include Ethernet upload, help, setup, and exit automation options for the technician to upload collected test results, request help from the test set, set up the test set, or exit automated testing to enable more manual testing, respectively.

With regard to FIGS. 9A-9C, different GUIs 900*a*-900*c*, respectively, are shown. The GUIs 900*a*-900*c* enable the technician to select a number of IP addresses that are assigned to a customer (e.g., 1, 2, 4, 8, 16) via a menu 902, as shown in FIG. 9A. The GUI 900*b* enables the technician to enter a base IP address (e.g., "69.68.103.213") by entering each of the four address components in four text entry fields 904*a*-904*d*. The GUI 900*c* may enable the technician to enter a subnet mask (e.g., "255.255.255.128") by selecting the subnet mask in a menu 906.

With regard to FIG. 10A, an illustrative GUI 1000*a* is shown to display test results from performing a static IP ping test. The test results may include a textual indicator 1002 and/or indicia 1004 that indicates that the static IP ping test has passed. A listing of test parameters 1006 and corresponding test results 1008 may be displayed in the GUI 1000*a*. In addition, a number of selectable elements 1010 that the technician may select to receive additional detail, show previous test results, perform a next test, or stop testing may be available for the technician.

As shown in FIG. 10B, a GUI 1000*b* may be displayed in response to the static IP ping test failing due to an IP address being invalid. Textual test results 1012 may be displayed in addition to an indicia 1014 which indicates that IP address 10.0.0.4 is invalid.

Figure 11:
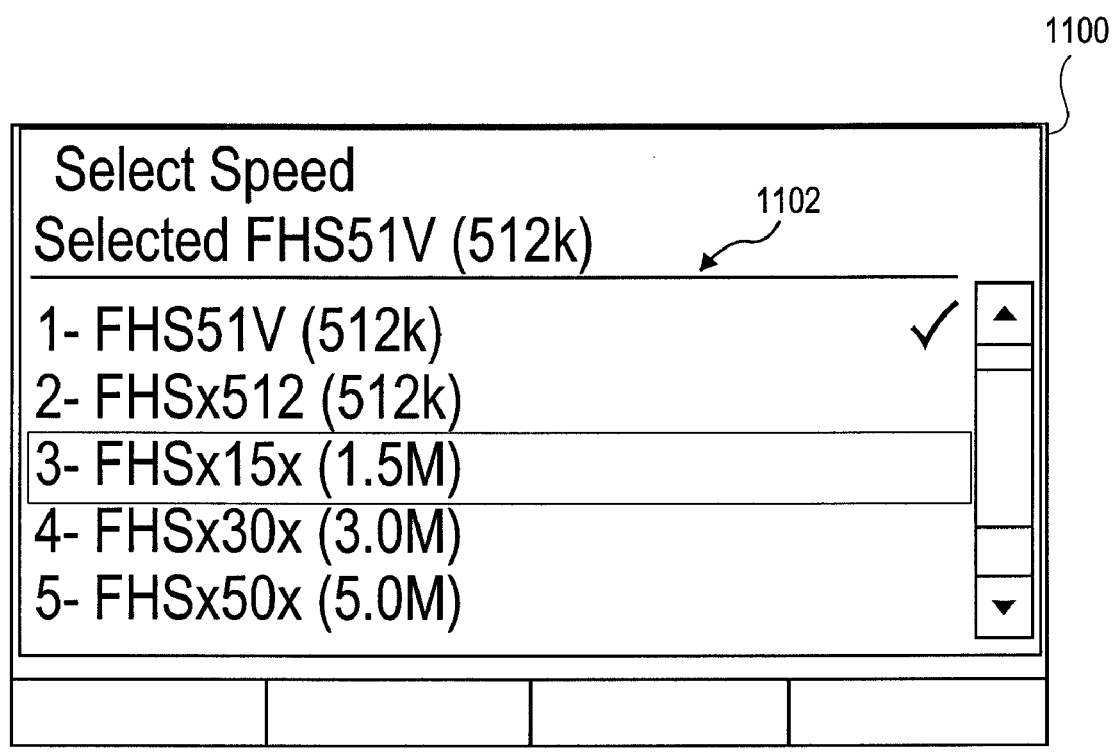
FIG. 11 is a screen shot of an illustrative GUI for a technician to interface in selecting a speed for testing a communications line.

With regard to FIG. 11, an illustrative GUI 1100 is shown. The GUI 1100 enables a technician to select speed of a communications line that is being or is supposed to be delivered to a customer premise (e.g., 512 KB, 1.5 MB, 3.0 MB, and 5.0 MB). As shown, the selectable speeds are presented in a menu 1102 from which the technician may select. It should be understood that alternative selectable elements may be available for the technician to select or otherwise enter a speed of communications being delivered to the customer premise.

FIGS. 12A and 12B show illustrative GUI's 1200*a* and 1200*b* that illustrate test results after performing ADSL tests. As shown in GUI 1200*a*, a list of test parameters 1202 better used in performing the ADSL tests is listed. Communications test parameters in both the up and downstream directions are also displayed in association with each of the listed test parameters. If a test parameter passes, then an indicia 1204, such as a checkmark in a circle, is displayed next to the test parameter test results. The GUI 1200*a* is illustrative of all of the ADSL tests passing. Conversely, the GUI 1200*b* is illustrative of one or more ADSL tests failing, where an indicia 1206, such as an "X" within a circle, is shown next to a test result that failed.

With regard to FIGS. 13A and 13B, an illustrative help message 1302 may be displayed in response to the technician selecting a "help" button or other indicia after a communications test has failed. As shown, the help message may include a "failure" section 1304*a*, "possible cause" section 1304*b*, "recommended" section 1304*c*, and service provisioning center contact information section 1304*d*. By providing each of these sections, the technician is provided with "on-the-job training" such that technicians with little or virtually no experience can troubleshoot communications lines at customer premises. Furthermore, the information provided in the help GUIs 1300*a* and 1300*b* can enable a technician, whether new or experienced, be more efficient by providing telephone numbers of particular service provisioning centers that are capable of handling failures of communications lines that are particular to certain communications protocols. As service centers change expertise or telephone numbers, the telephone numbers may be altered by a test server downloading updated telephone numbers. The information provided in the GUIs 1300*a* and 1300*b* are illustrative and it should be understood that additional information, including images, videos, or any other information to assist a technician in troubleshooting a communications line failure may be provided on the test set and displayable in response to a technician requesting assistance with troubleshooting the communications lines or provisioning of a communications line at a customer premise. If images or videos are available, the test set may be configured to store recent downloads to limit the need for a technician to repeatedly download the images and videos from the test server.

Figure 14B:
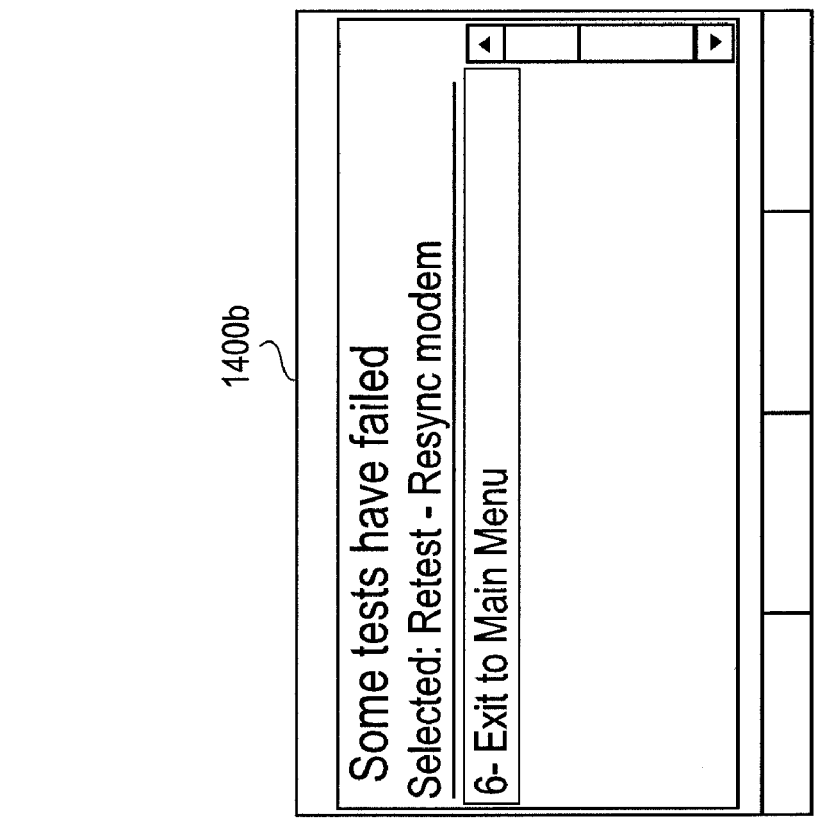
FIGS. 14A and 14B are screen shots of an illustrative GUI with a menu after completion of a communications test by a test set.
Figure 14A:
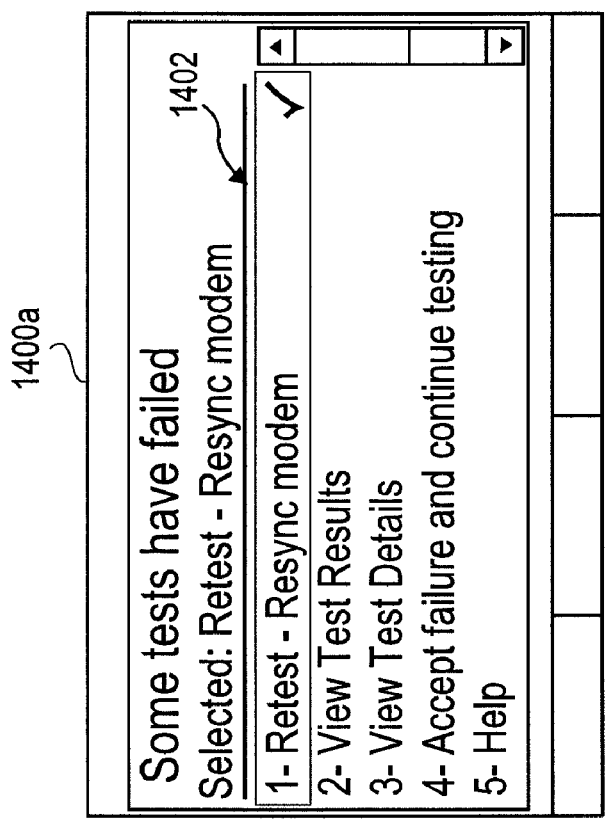

With regard to FIGS. 14A and 14B, GUI's 1400*a* and 1400*b* may be utilized to display that some synchronization tests have failed and a menu 1402 may display a number of selectable options for the technician. The selectable options in the menu 1402 may include a retest, view test results, view test details, accept failure and continue testing, help, and exit to the main menu. Similar to the information displayed in FIGS. 13A and 13B, if the technician selects option 5 (i.e., help options), then information associated with synchronization testing may be displayed to the technician in a GUI to include failure information, possible causes of the failure, recommendations for correcting the failure, and telephone numbers associated with service provisioning centers to assist in correcting the failures for the synchronization tests.

Figure 15:
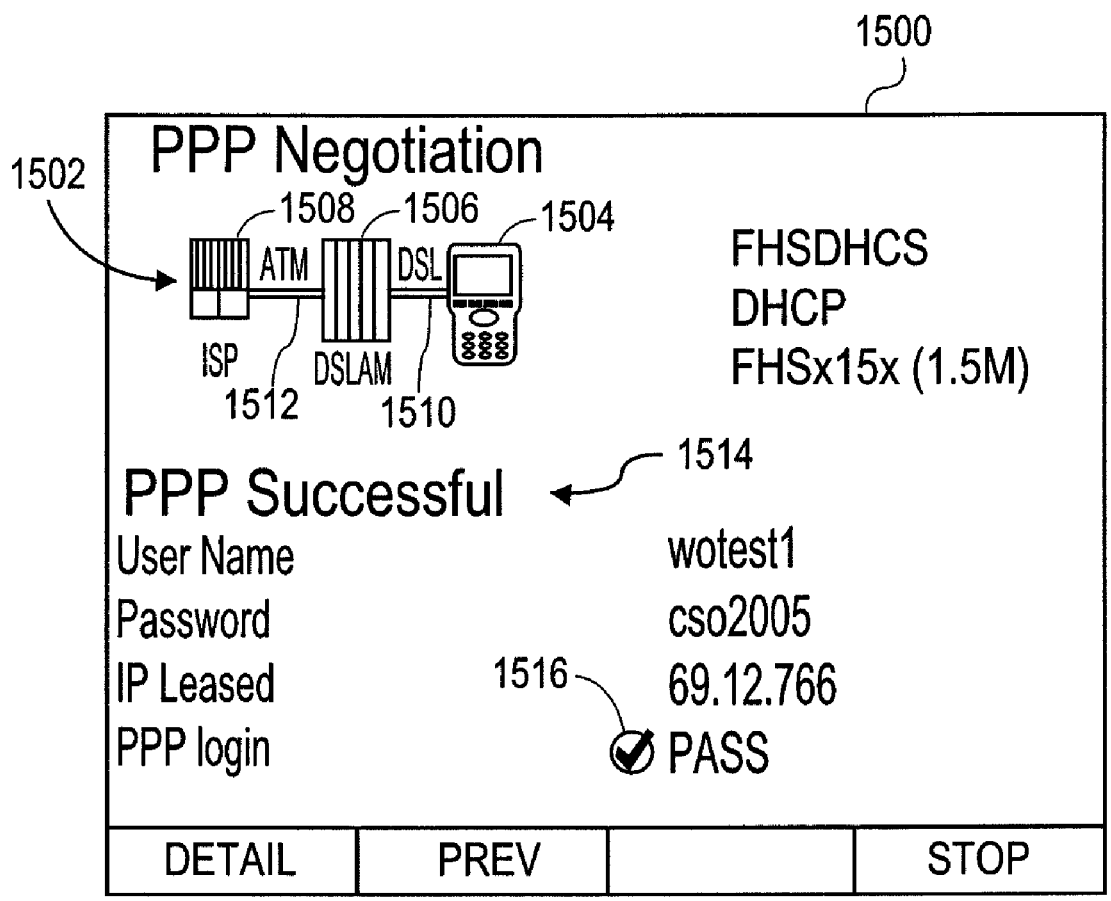
FIG. 15 is a screen shot of an illustrative GUI showing data sync test results.

With regard to FIG. 15, a GUI 1500 may be displayed for data synchronization testing in accordance with the principles of the present invention. As shown, the graphical image 1502 showing a test set 1504 and network components 1506 and 1508 that are being used in performing a PPP negotiation, including communications protocols over DSL link 1510 and ATM link 1512 between the test set 1504 and DSLAM 1506 and DSLAM 1506 and ISP 1508, respectively. If the data sync test is successful, then a textual notification 1514 may be displayed on the GUI 1500 and an indicia 1516 indicative of a PPP login test passing may be displayed.

With regard to FIGS. 16A and 16B, GUIs 1600*a* and 1600*b* may be displayed in response to a data sync test failing. As shown in GUI 1600*a*, a textual notification 1602 indicates that the PPP data sync test failed and indicia 1604 further indicates that the PPP login failed. As shown in GUI 1600*b*, information that may be helpful to a technician may be displayed. As shown, the information may include specific information of a test that failed (e.g., "PPP negotiation failed"). Furthermore, possible causes may be displayed, possible action items to correct the problem may be displayed, and specific telephone numbers associated with a service provisioning center that is capable of assisting the technician with correcting the specific failure may be displayed.

Figure 17:
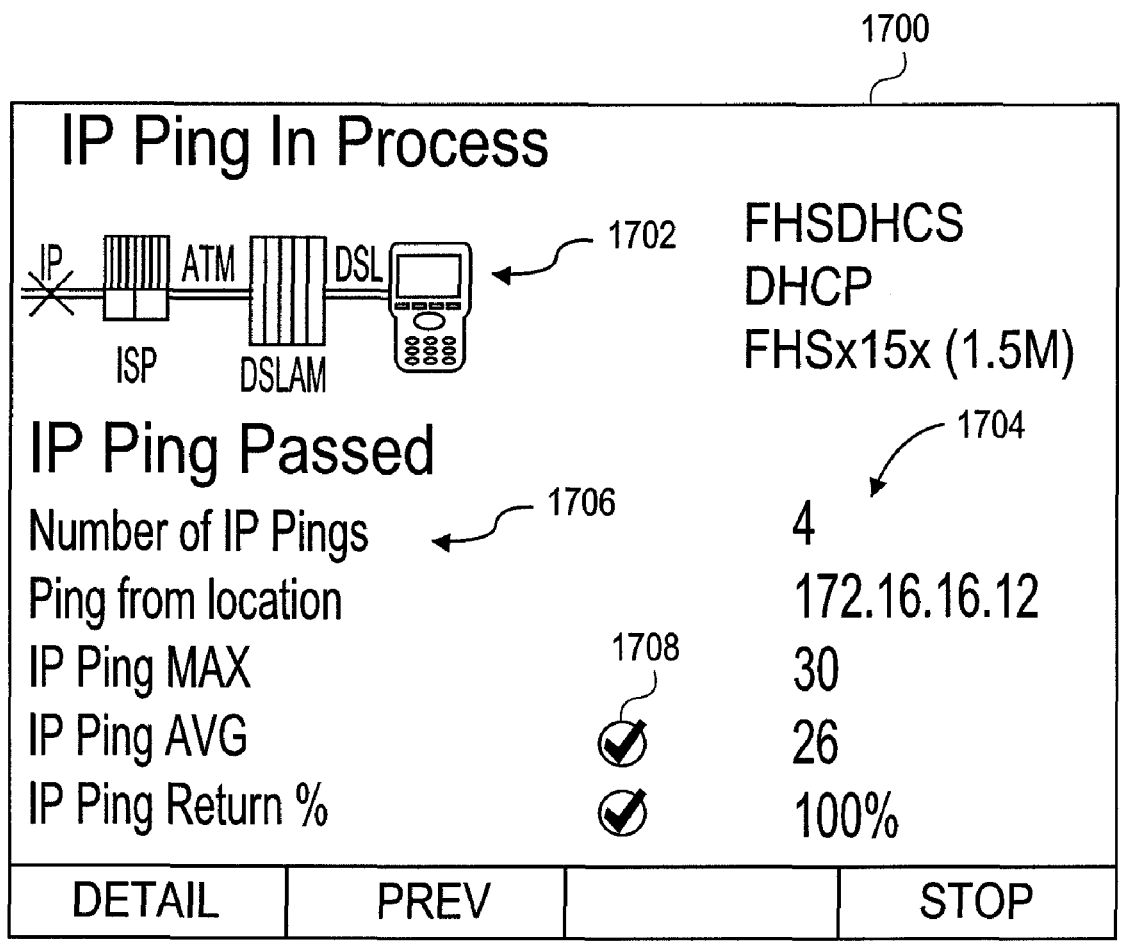
FIG. 17 is a screen shot of an illustrative GUI displaying a passing ping test.

With regard to FIG. 17, a GUI 1700 showing an IP ping test in process is displayed. As shown, a graphical image 1702 may display each of the communications paths and network elements that are part of performing an IP ping test may be displayed. Test results 1704 of each test parameter 1706 may also be displayed. The test parameters may include the number of IP pings, ping from location, IP ping maximum, IP ping average, and IP ping return percentage. If the tests are successful, then indicia 1708 may be displayed to indicate that the test parameter passed.

With regard to FIGS. 18A, 18B, and 18C, GUIs 1800*a*, 1800*b*, and 1800*c* may be displayed in response to an IP ping hardware failure occurring during testing. Test results 1802 indicate that IP ping maximum, IP ping average, and IP ping return percentage are all zero, which indicates that there is a failure from the test set to a hardware device (e.g., server) located on a network occurring. In other words, the test set is unable to receive a ping from the network device. In response, the technician may select a soft-button or hard-button on the test set, such as soft-button 1804, to display GUI 1800*b* to assist the technician in troubleshooting the test failure. The GUI 1800*b* may display a variety of text information 1806 that includes the test that failed, possible causes, recommendations, telephone numbers of service centers that may assist the technician with correcting the problems. The GUI 1800*c* shows a menu 1808 that the technician may select to retry the test, view test results, view test details, go to a failed close out, or request help to display information to assist the technician in repairing or troubleshooting the communications line or provisioning of the communications line for the customer premise.

Figure 19A:
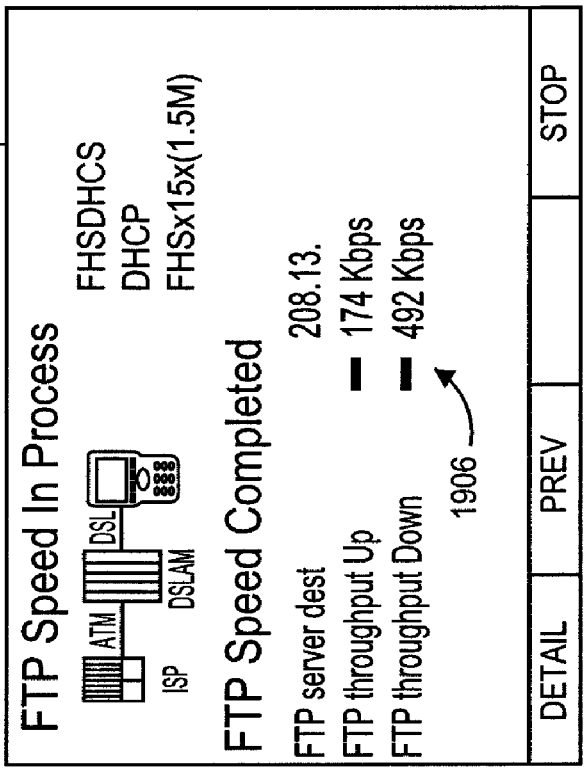
FIGS. 19A and 19B are screen shots of illustrative GUIs displaying results of an FTP speed test.
Figure 19B:
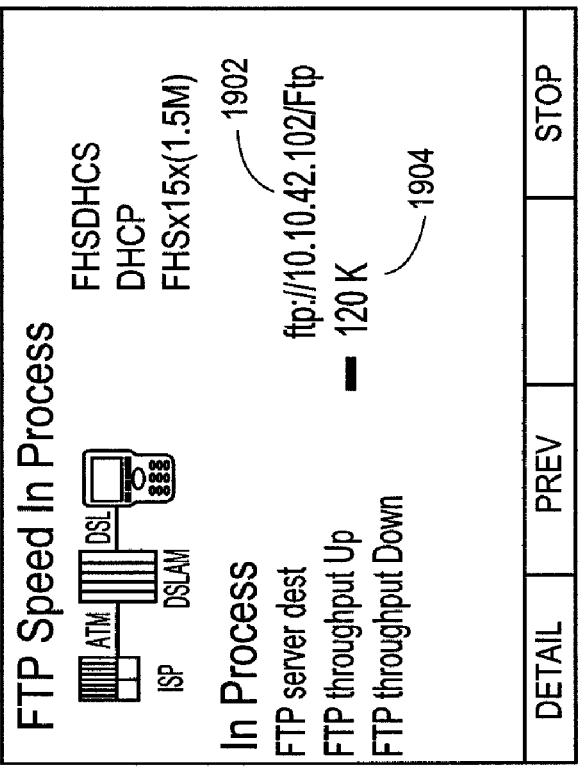

With regard to FIGS. 19A and 19B, GUIs 1900*a* and 1900*b* are displayed, respectively. GUI 1900*a* displays a file transfer protocol speed test in process. The FTP speed test may include testing communication speed from an address of an FTP server destination 1902, including speed of FTP throughput up 1904 and speed of FTP throughput down. Results of the FTP speed test are shown in the GUI 1900*b*, where the results 1906 may be accompanied with indicia (not shown) indicative of the test parameters passing or failing.

To illustrate an unsuccessful FTP test, FIGS. 20A and 20B are shown with GUIs 2000*a* and 2000*b*, respectively, indicating that test parameters 2002 having test results 2004 that indicate that the communications speed is 0 Kbps. A message in GUI 2000*b* may indicate that the test set is unable to connect to the FTP server and to retry the speed test.

Figure 21:
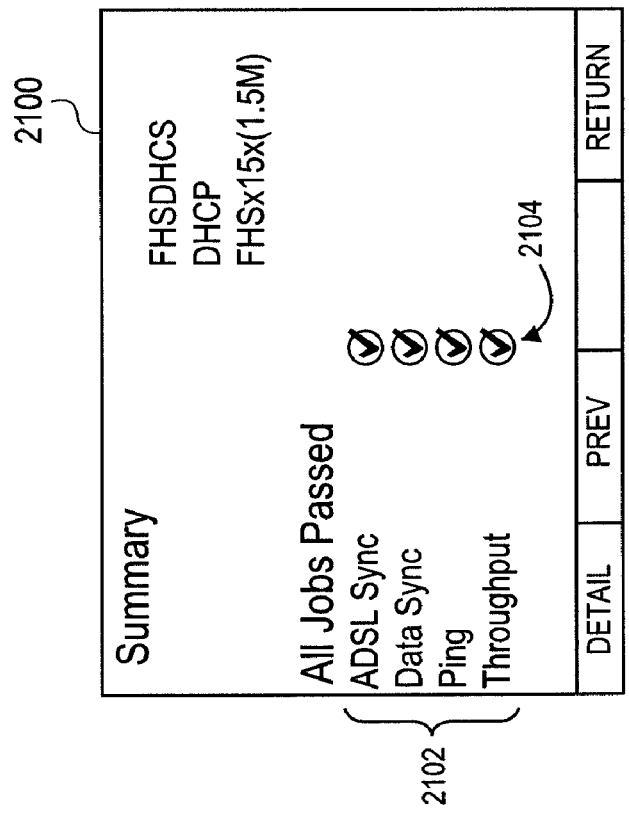
FIG. 21 is a screen shot of an illustrative summary page showing indicia representative of different communications tests passing.

With regard to FIG. 21, a GUI 2100 may display a summary of the communications test 2102 and results of the communications tests by indicia 2104 indicating that the tests either passed or failed. If the tests passed, an indicia may indicate a positive pass, such as a checkmark in a circle. Alternatively, a failed test may be indicated with indicia shown an "X" in a circle. It should be understood that any indicia representative of a pass or fail may be presented in a summary page to provide final assurance to the technician that each of the tests performed by the test set at the customer premise have passed or failed.

Figure 22:
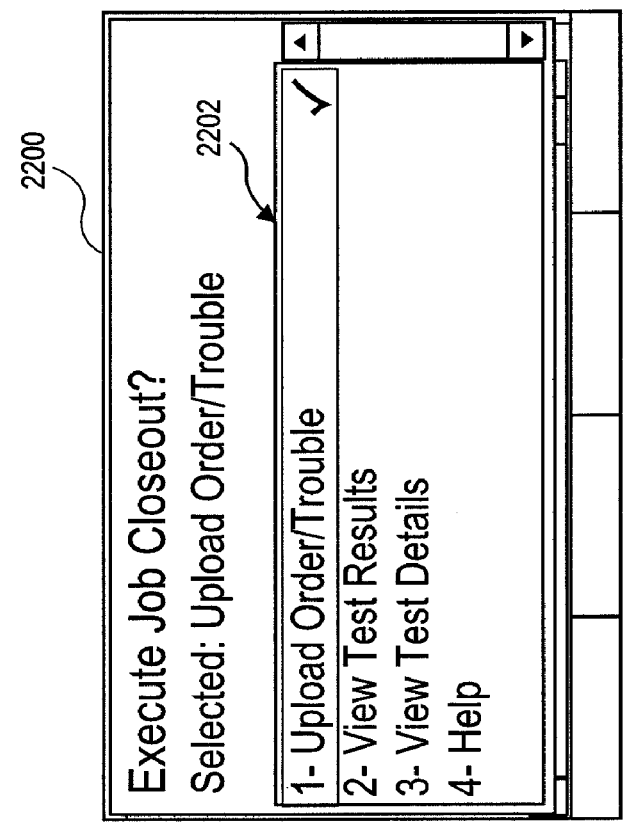
FIG. 22 is a screen shot of an illustrative GUI showing a menu for a technician to close out a job.

With regard to FIG. 22, a GUI 2200 may be utilized to execute a job close out. In closing out a job, a menu 2202 may be displayed for the technician to select to upload an order completion report or trouble report after performing communications testing at the customer premise, view test results, view test details, or request help.

Figure 23:
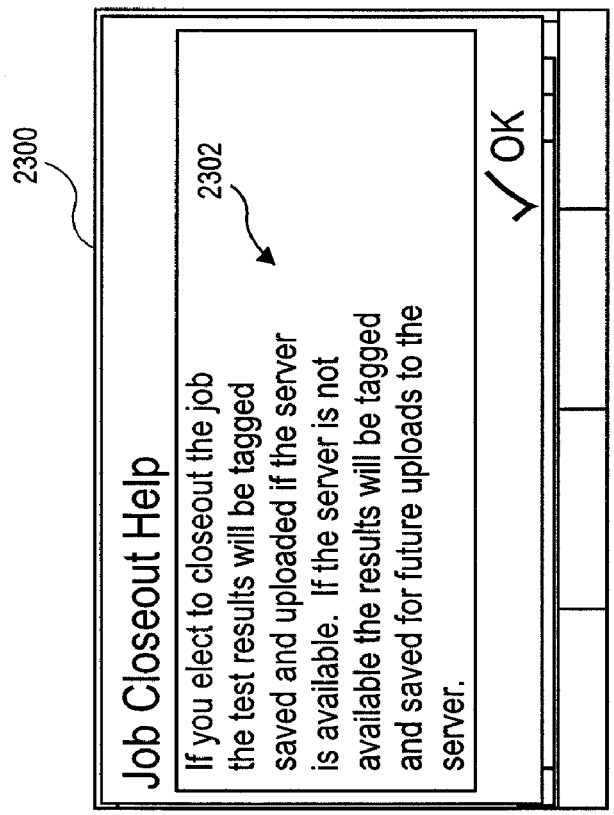
FIG. 23 is a screen shot of an illustrative GUI showing a message to assist a technician in closing out a job.

With regard to FIG. 23, an illustration of an illustrative GUI 2300 that displays a message 2302 in response to the technician selecting job close out help is shown. As indicated in the message 2302, the technician is notified that if he or she elects to close out the job that the test results will be tagged as saved and uploaded if the test server is available.

Figure 24:
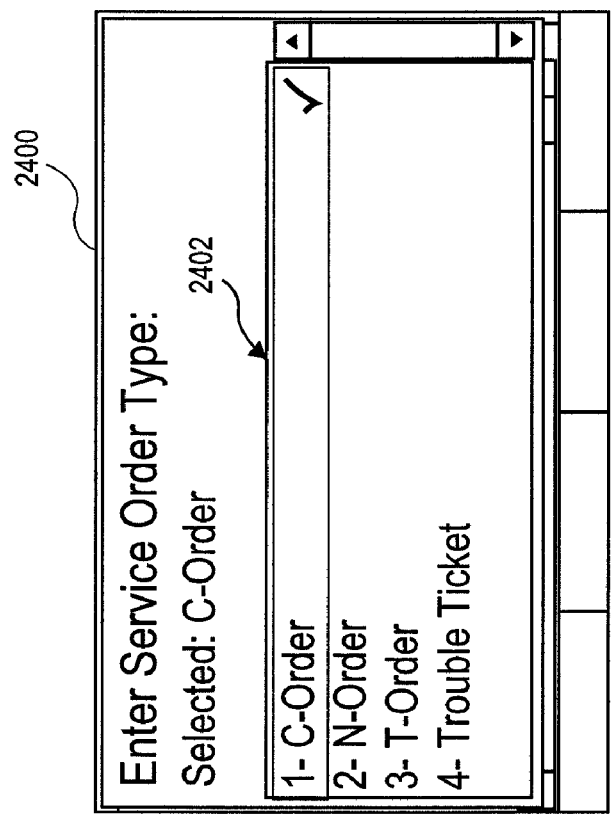
FIG. 24 is a screen shot of an illustrative GUI displaying a menu for a technician to select a particular type of job that he or she is performing.

With regard to FIG. 24, a screenshot of an illustrative GUI 2400 that enables a service technician utilizing a test set to select a service order type is shown. In selecting a service order type, a menu 2402 may be displayed on the GUI 2400 that provides a list of selectable options for the technician to indicate the service order type that he or she is servicing. It should be understood that a variety of different service orders may be presented to the technician and that the service order selection is typically performed prior to performing a test. However, the service order type may be selected after testing has occurred.

Figure 25:
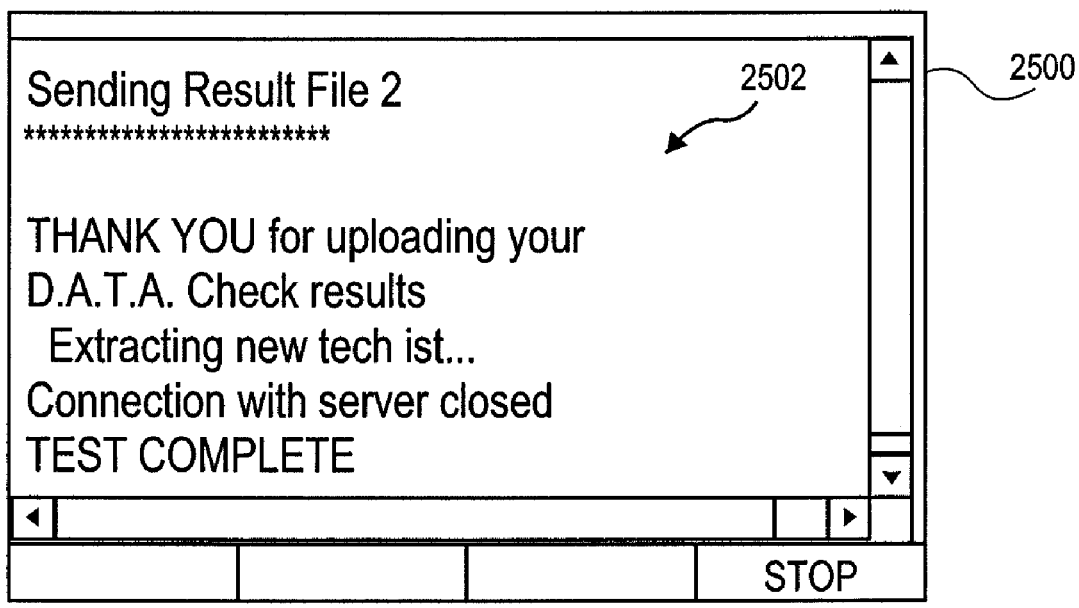
FIG. 25 is a screen shot of an illustrative GUI displaying a notification confirming upload and successful completion of data transfer from a test set to a server of a communications service provider.

With regard to FIG. 25, a screenshot of an illustrative GUI 2500 that displays a message in response to the technician uploading test results from a test set to a test server is shown. As indicated, a message 2502 may indicate to the technician that the test result data has been uploaded and that new test parameters have been extracted and downloaded to the test set for future testing. Further indications that (i) the connection with the server is closed, and (ii) that the test is complete may indicate to the technician that his or her job is complete at the customer premise so that he or she may continue on to his or her next job.

TABLE II is a listing of an illustrative input screen to request a job summary report. As the test sets may be assigned to certain personnel, such as vice president, director, district manager, and supervisor, a user may enter names of the personnel to generate a summary report of all test sets that are assigned to those personnel members. Furthermore, the user may select dates between which any usage of the test sets that match the personnel will be presented to the user in a summary report. It should be understood that other parameters may be available for the user to enter to generate job summary reports from test set usage over a given time period.

TABLE II

| Parameter | User Entry |
|---|---|
| Vice President: | Kevin McCarter |
| Director: | Patrick O'Grady |
| District Manager: | David Likosar |
| Supervisor: | LaDawn Atkinson |
| From: | Jan. 21, 2008 |

TABLE II-continued

| Parameter | User Entry |
|---|---|
| To: | Jan. 28, 2008 |
| Sort By: | NONE |
| Then By: | NONE |
| Then By: | NONE |
| Job Number: | |
| Phone Number: | |
| Tech. ID: | |
| Report Type: | HTML |

TABLE III is a listing of an illustrative test set report as identified by test set ID, test set model, vice president, director, district manager, and supervisor. It should be understood that identifying the test sets based on personnel is just one way to identify test sets and that other ways, such as identifying each test set by department, group, and section, for example, may alternatively be utilized. However, by assigning specific personnel to each test set, there is a higher degree of responsibility for each of the personnel members and technician. A technician ID who last used to the test set may also be included in the summary report.

As each of the test sets are utilized to collect test data from customer premises, a "last sync" date may show a date when each test set is used to upload test data from communications lines of one or more customer premise. The summary report may also show the number of jobs performed in the recent past, including day, week, month, and year, so that an indication of productivity may be provided to management. To verify that each of the test sets are standardized or otherwise configured the same, a version of firmware, automation or application (i.e., software), and test limits may be listed to show that each of the testing information (i.e., firmware, software, and test limits) is being executed or utilized by each test set. By having standardized test sets, a technician can be assured that a failure at one customer premise is a result of the communications or provisioning to the customer premise rather than the test set. The test set serial number may also be provided in the summary table so that inventory may be maintained.

TABLE IV is a listing of an alternative illustrative job summary report. In this summary report, job number, job type, and job location are listed, thereby providing management and customer service with information as to whether specific jobs were performed for specific customers and locations at which the jobs were run. Furthermore, by tracking specific jobs that were run, location of each test set may be maintained. As each test set may cost thousands of dollars and there are several thousands of test sets used by communications service providers, maintaining inventory of the test sets is cost effective for the companies.

TABLE III

| HST ID | Model | Vice President | Director | District Manager | Supervisor | Tech ID Last Used | Last Sync Date/Time | Jobs In Last Day | Week | Month | Year |
|---|---|---|---|---|---|---|---|---|---|---|---|
| 121357000000 | HST-3000c | Bob Stoboda | Mike Brill | Bernie Cryan | Fred Miller | 44611 | 11-06-08 17:36:27 | 0 | 11 | 28 | 445 |
| 1A3254000000 | HST-3000c | Bob Stoboda | Mike Brill | Bernie Cryan | Fred Miller | 44609 | 11-07008 14:38:27 | 1 | 2 | 15 | 151 |
| 2EAA1D000000 | HST-3000c | Bob Stoboda | Mike Brill | Bernie Cryan | Fred Miller | 44634 | 10-27-08 14:28:57 | 0 | 0 | 2 | 88 |
| 401254000000 | HST-3000c | Bob Stoboda | Mike Brill | Bernie Cryan | Fred Miller | 44503 | 11-06-08 11:59:26 | 0 | 2 | 22 | 157 |
| 7CE756000000 | HST-3000c | Bob Stoboda | Mike Brill | Bernie Cryan | Fred Miller | 44606 | 11-07-08 13:39:52 | 1 | 3 | 13 | 131 |

TABLE III-continued

| | | | | | | | | | | |
|---|---|---|---|---|---|---|---|---|---|---|
| C0671C000000 | HST-3000c | Bob Stoboda | Mike Brill | Bernie Cryan | Fred Miller | 44601 | 11-07-08 16:24:22 | 4 | 7 | 22 | 140 |
| C3415A000000 | HST-3000c | Bob Stoboda | Mike Brill | Bernie Cryan | Fred Miller | 44607 | 11-07-08 10:39:47 | 1 | 7 | 18 | 168 |
| C4EB37000000 | HST-3000c | Bob Stoboda | Mike Brill | Bernie Cryan | Fred Miller | 44632 | 09-04-08 13:31:16 | 0 | 0 | 0 | 16 |
| E4AE56000000 | HST-3000c | Bob Stoboda | Mike Brill | Bernie Cryan | Fred Miller | 44632 | 10-23-08 11:01:29 | 0 | 0 | 2 | 183 |
| F6F637000000 | HST-3000c | Bob Stoboda | Mike Brill | Bernie Cryan | Fred Miller | 44630 | 10-27-08 11:37:44 | 0 | 0 | 4 | 50 |

| | | Version | | | |
|---|---|---|---|---|---|
| HST ID | Last Job = | Firmware | Automation | Test Limits | HST S/N |
| 121357000000 | 0572312 | 6.20.25 | 4.0.4 | 9.8.2.4 | ARHP5003962439 |
| 1A3254000000 | N867201 | 6.20.25 | 4.0.4 | 9.8.2.4 | ARHP-D1469088 |
| 2EAA1D000000 | 0506628 | 6.20.25 | 4.0.4 | 9.8.2.4 | ARCK-F1031236 |
| 401254000000 | C715437 | 6.20.25 | 4.0.4 | 9.8.2.4 | ARHP-D1469483 |
| 7CE756000000 | 0561428 | 6.20.25 | 4.0.4 | 9.8.2.4 | ARHP-D1469094 |
| C0671C000000 | 0587598 | 6.20.25 | 4.0.4 | 9.8.2.4 | ARHP-D1660116 |
| C3415A000000 | C868566 | 6.20.25 | 4.0.4 | 9.8.2.4 | ARHP5004062617 |
| C4EB37000000 | C123458 | 6.20.25 | 4.0.4 | 9.8.2.4 | ARFL-D0752491 |
| E4AE56000000 | 0467201 | 6.20.25 | 4.0.4 | 9.8.2.4 | ARHP-D1469508 |
| F6F637000000 | 0502030 | 6.20.25 | 4.0.4 | 9.8.2.4 | ARFL-D0752490 |

TABLE IV

| Expand | Job Number (Click for detail) | Telephone | Vice President | Director | District Manager | Supervisor | Tech ID | Job Date/Time |
|---|---|---|---|---|---|---|---|---|
| | 0577549 | 4078304616 | Bob Stoboda | Patrick OGrady | Doug VanCleave | Charles Clendenny | 41299 | 11-07-08 13:43:46 EST |
| — | C817287 | 4073324963 | | | | | 41304 | 11-07-08 10:12:19 EST |
| | C818513 | 4072601486 | | | | | 41239 | 11-07-08 15:51:47 EST |

| Expand | Job Number (Click for detail) | Job Pass? | Fail Cause | Job Type | Job Location | HST ID | Closeout Comments |
|---|---|---|---|---|---|---|---|
| | 0577549 | True | | DHCP-FHSDHCS | Jack | 606C53000000 | |
| — | C817287 | True | | DHCP-FHSDHCS | Demarc w/IW | 4C9B49000000 | |
| | C818513 | True | | DHCP-FHSDHCS | Frame | BD6451000000 | |

Tables V and VI are listings of an illustrative detailed job report. The details show specific test results measured at a customer premise. A call center representative may assist the technician who took the measurements in a timely manner as the call center representative may view the test results upon the technician uploading the test results.

TABLE V

| PDF Export | Click Here |
|---|---|
| Job Number | C818513 |
| Phone Number | 4072601486 |

TABLE V-continued

| PDF Export | Click Here |
|---|---|
| Model | HST-3000c |
| Vice President | Bob Sloboda |
| Director | Patrick OGrady |
| District Manager | Doug VanCleave |
| Supervisor | Charles Clendenny |
| Tech ID | 41239 |
| Inst Job Date/Time | 11-07-08 16:45:27 |
| Server Upload | 11-07-08 15:51:47 EST |
| Job Pass | True |

TABLE VI

| General | | | | | | | | |
|---|---|---|---|---|---|---|---|---|
| OverAll Pass? | Failure Cause | Over Ride? | Profile Name | Data Type | Speed | Firmware | Versions Automation | Test Limits |
| True | | Pass | C818513 | G.DMT | FHSx30x (3.0 | 6.20.25 | 4.0.4 | 9.5.2.3 |

TABLE VI-continued

Copper Measurements

| Copper | DC Volts | | | AC Volts | | | Insulation Resistance Mhoms | | |
|---|---|---|---|---|---|---|---|---|---|
| Pass? | T/R | T/G | R/G | T/R | T/G | R/G | T/R | T/G | R/G |
| N/A | N/A | N/A | N/A | N/A | N/A | N/A | N/A | N/A | N/A |

Copper Measurements

| | Cap Balance | | Long | Load | Power | Voice | WB Noice | 1004 Hz | |
|---|---|---|---|---|---|---|---|---|---|
| Cap Feet | T/G (pf) | R/G (pf) | Bal dB | Load Coils | Infl dB | Noise dBmC | GFilter dB | Loss dB | Current ma |
| N/A | N/A | N/A | N/A | N/A | N/A | N/A | N/A | N/A | N/A |

ADSL

| ADSL | Actual Rate kbps | | Noise Margin dB | | Attenuation dB | | Capacity (%) | | Capacity (kbps) | |
|---|---|---|---|---|---|---|---|---|---|---|
| Pass? | Up | Down | Up | Down | Up | Down | Up | Down | Up | Down |
| Pass | 768 | 3520 | 16 | 23 | 3 | 3 | 88.8889 | 45.2675 | 864 | 7776 |

ADSL

| TX Power dBm | | CRC Errors | | RS Byte Error | | Loop | Standard |
|---|---|---|---|---|---|---|---|
| Up | Down | Local | Remote | Local | Remote | Length | Used |
| 12 | 6 | 0 | 0 | 0 | 0 | 1000 | G.DMT |

PPP/IP

| PP/IP Pass? | PPP Successful IP leased | DHCP Successful IP leased | Fixed IP IP |
|---|---|---|---|
| Pass | n/a | 67.232.194.117 | n/a |

Ping/FTP

| Ping/FTP | Ping | | | | FTP throughput (kbps) | | |
|---|---|---|---|---|---|---|---|
| Pass? | Pass | mas (ms) | avg (ms) | % return | pass? | Up | Down |
| Pass | Pass | 70 | 55 | 75 | NA | 647 | 2814 |

TABLE VII is a listing of an illustrative test report. As shown, test set settings, each of the communications tests that were performed, associated test results, and close out information are available for review by the technician or other user, such as a supervisor or service center technician, to review. By having a complete testing listing, diagnosis of settings problems, testing problems, test set configuration problems, or any other problems may be used to help diagnose a problem at a customer premise.

TABLE VII

Software Version Embarq_4.0.4,GERLT54SGK71,12/19/2008 2:53:24 PM
Build Version: 9.5.2.3
Firmware Version: 6.20.25
HST ID: BD6451000000
Tech Type: Cust Service Tech
Leakage Current: Off
Voltage termination: 100K ohms
Fri Dec 19 16:42:08 UTC 2008
Job Type: DHCP - FHSDHCS --

TABLE VII-continued

MultiMode; Trellis Coding Off
Echo Cancellation -- Off; Coding Gain -- On
PPP Failures -- True
Speed Selection -- FHSx30x (3.0M)
IP over Ethernet; VPI 8;VCI 35
Encapsulation -- LLC Snap
*****************************
Starting ADSL Testing
Is attempting ADSL Sync
ADSL Stopped
Is Training ... 1
Is Training ... 2
Is Training ... 3
Is Training ... 4
Is Training ... 5
Is Training ... 6
Has achieved Show Time

| Test UP | P/F | UP | Thresh |
|---|---|---|---|
| Actual Rate | P | 768K | >=448K |
| Actual Rate | P | 768K | <=768K |

TABLE VII-continued

| | | | |
|---|---|---|---|
| Max Rate | — | 864K | — |
| Capacity | P | 89% | <=90 |
| Noise Margin | P | 16 dB | >=6 dB |
| Attenuation | P | 3 dB | <=60 dB |
| Tx Power | — | 12 dBm | — |
| Test DOWN | P/F | DOWN | Thresh |
| Actual Rate | P | 3520K | >=3072K |
| Actual Rate | P | 3520K | <=3520K |
| Max Rate | — | 7776K | — |
| Capacity | P | 45% | <=90 |
| Noise Margin | P | 23 dB | >=6 dB |
| Attenuation | P | 3 dB | <=60 dB |
| Tx Power | — | 6 dBm | — |
| Est Loop Length | — | 1000 Ft | — |

All results PASSED
IPoE Successful
  IP address 67.232.194.117
  DNS address 209.26.88.31
  GATEWAY address 67.232.192.1
Data Link Up
*****************************
Attempting IP Ping
  Pinging 209.26.88.31 with
  16byte packet
  4 sent, 3 received, 25% loss +++
  Min 48 ms, Max 70 ms, Avg 55 ms
Ping AVE <200 ms PASS
PING Test PASSED
*****************************
Running Throughput Test...
Upload throughput 647 Kbps
Downloading file...
Download throughput 2814 Kbps
Local CRC ERR: 0 – 0 = 0
Local RS ERR: 0 – 0 = 0
Remote CRC ERR: 0 – 0 = 0
Remote RS ERR: 0 – 0 = 0
*****************************
Job DHCP - FHSDHCS
ALL TESTS PASSED
All TESTS RUN
Proceeding to Job Closeout
ACT D/U3520/768 NM D/U23/16 ATT D/U3/3 PG RCV%75 CRC
L/R0/0 RS ERR L/R0/0 FTP D/U2814/647
Close out Job is selected to be executed
Frame-at the MDF
== Close out details ==
  Job# C818513
  Tech ID-41239
  Location-Frame
  Phone-4075551486

Figure 26:
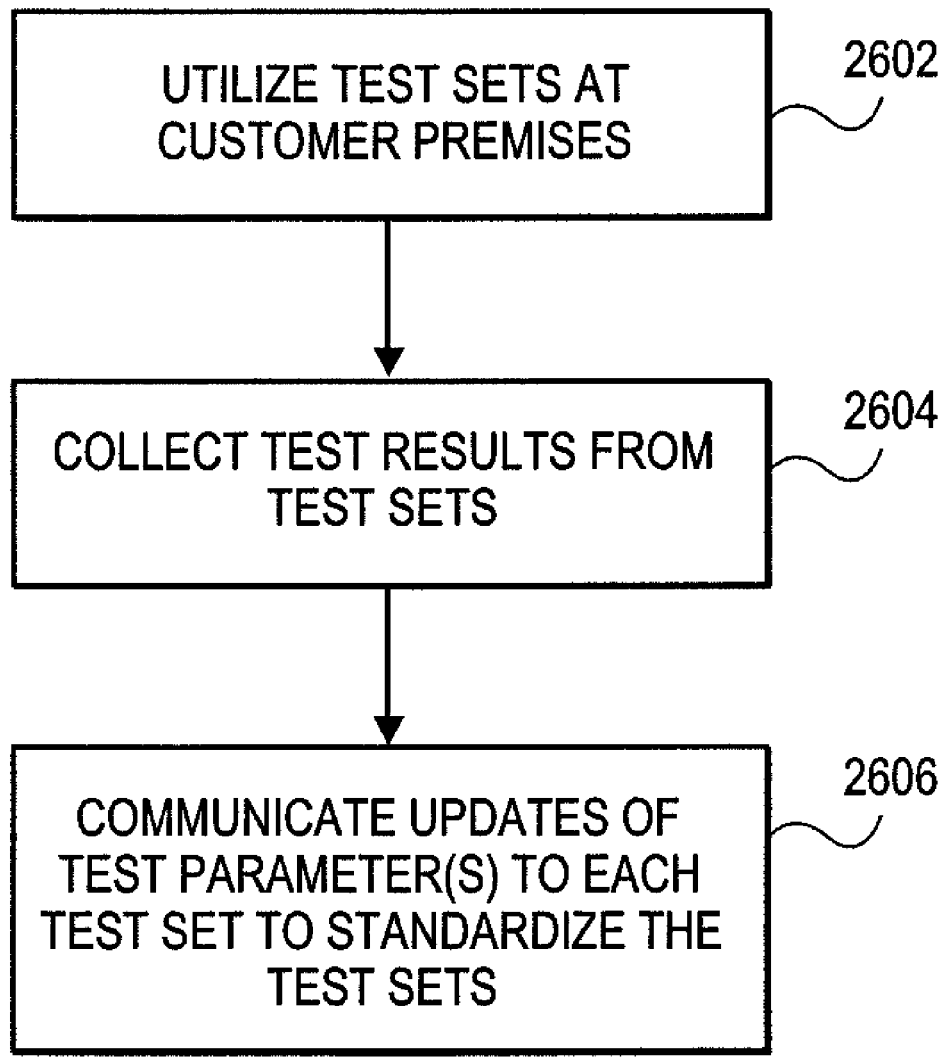
FIG. 26 is a flow chart of an illustrative process for standardizing communications lines test sets.

With regard to FIG. 26, an illustrative process 2600 for standardizing communications lines test sets used by technicians for testing communications lines at customer premises is shown. The process 2600 starts at step 2602, where test sets are utilized at customer premises. At step 2604, test results are collected from the test sets. In collecting the test results, the test sets may automatically, semi-automatically, or manually upload the test results when connected to a communications line. In one embodiment, the test set uploads the test results in response to completing testing on the communications lines. In one embodiment, the test set is configured with wireless communications capabilities and the test results may be communicated via a wireless connection to a network that can communicate the test results to a test server configured to collect the test results. At step 2606, update of one or more test parameters may be communicated to each test set to standardize the test sets. In updating the test parameter(s), the test server may communicate the test parameter(s) in response to receiving the test results. The test parameter(s) are values that are used to determine whether a communications line is functioning properly at a customer premise. In addition to downloading test parameter(s), software and firmware may additionally be downloaded to each of the test sets to ensure that each test set has the same configuration (e.g., operating the same software, firmware, and test parameter(s)).

Figure 27:
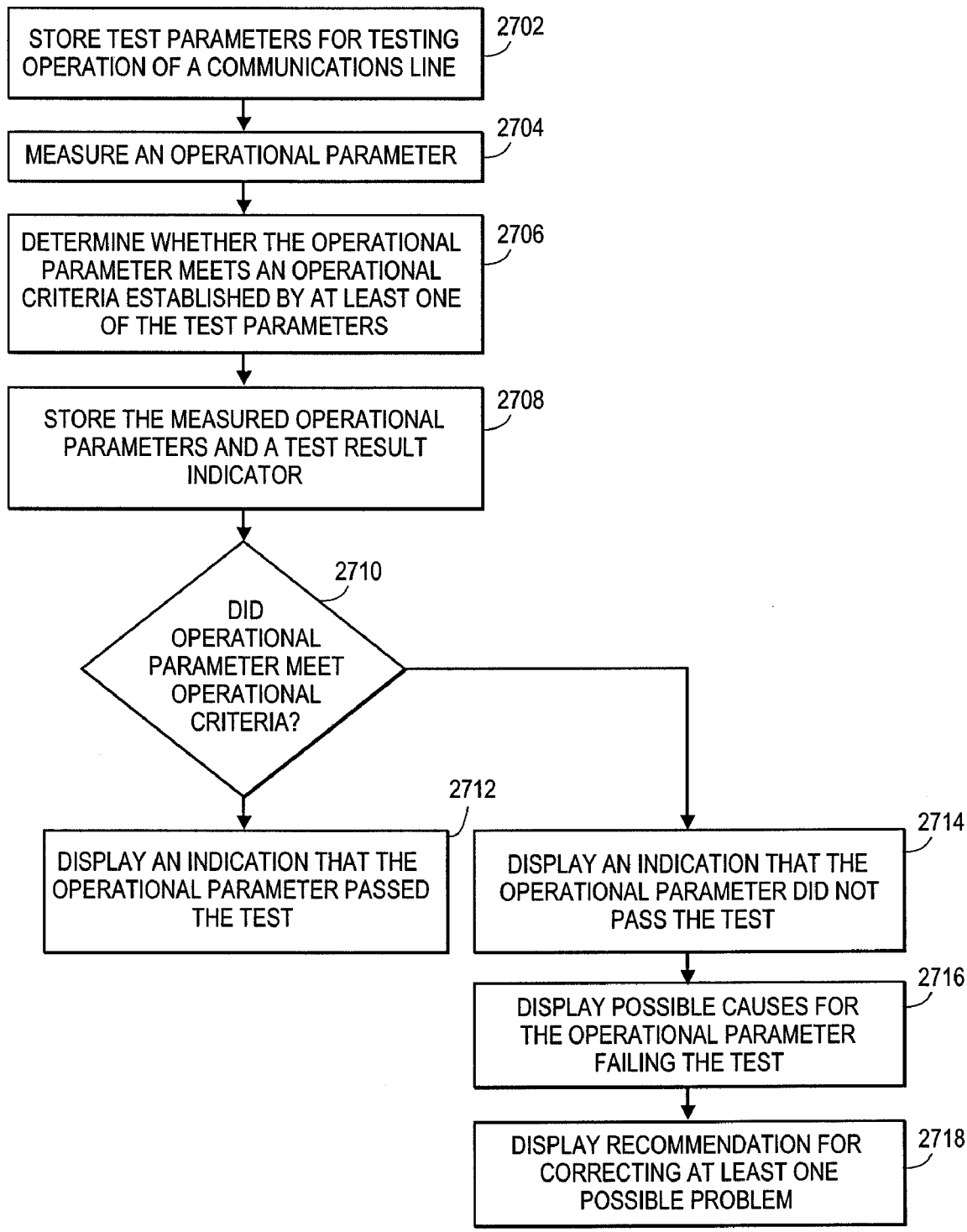
FIG. 27 is a flow chart of an illustrative process for assisting technicians in repairing communications lines.

With regard to FIG. 27, an illustrative process 2700 for assisting technicians in repairing communications lines is provided. The process 2700 operates to provide for on-the-job training as a technician with little in-house training can work in the field by simply following failure instructions and calling for assistance as provided by telephone numbers in response to each test failure. The process 2700 starts at step 2702, where test parameters are stored for testing operation of a communications line at a customer premise. The test parameters may be stored in memory of a test set configured to test communications lines. At step 2704, an operation parameter may be measured. The operational parameter may be any operational parameter on any OSI Layer. At step 2706, a determination may be made as to whether the operational parameter meets an operational criteria established by at least one of the test parameters. For example, the operational criteria may be upper and lower boundary values that a test result is to be within to pass the test. At step 2708, the measured operational parameters and a test result indicator (e.g., "pass" or "fail") may be stored.

At step 2710, a determination as to whether the operational parameter met the operational criteria is made. If so, then at step 2712, an indication that the operation parameter passed the test is displayed. In one embodiment, the indication is a textual indication (e.g., "pass" or "fail"). In another embodiment, the indication may include an indicia, such as a checkmark with a circle around it. If the operational parameter did not meet the operational criteria, then the process continues at step 2714, where an indication is display that the operational parameter did not pass the test. At step 2716, possible causes for the operational parameter failing the test are displayed. And, at step 2718, recommendations for correcting at least one possible problem are displayed. The technician may view and follow the recommendations to correct the problem. In addition, one or more telephone numbers of service centers where technicians can assist the field technician to correct the problem or change provisioning may be displayed. By providing useful information in response to a test failure being determined at a customer premise, the technician can be provided on-the-job training.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A system configured to assist telephone service technicians in repairing communications lines, said system comprising:

a memory configured to store test parameters for testing operation of a communications line;

an input/output (I/O) unit configured to communicate over the communications line with a network node;

an electronic display; and a processing unit in communication with said memory, I/O unit, and electronic display, said processing unit configured to:

measure an operational parameter of communications over the communications line via said I/O unit;

determine whether the operational parameter meets an operational criteria established by at least one test parameter of the test parameters;

store the measured operational parameters and a test result indicator as to whether the operational parameters met the operational criteria in said memory; and if the operational parameter met the operational criteria, then display a pass indicator representative of the operational parameter passing a test of the operational parameter, wherein the pass indicator includes at least two of a textual indication, a graphical indicia, and values associated with measurement of the operational parameter that are simultaneously displayed;

otherwise, if the operational parameter did not meet the operational criteria, then:

display a fail indicator representing that the operational parameter did not pass the test on said electronic display, wherein the fail indicator includes at least two of a textual indication, a graphical indicia, and values associated with measurement of the operational parameter that are simultaneously displayed;

display possible causes for the operational parameter failing the test on said electronic display;

display recommendations for correcting at least one possible problem that lead to the operational parameter not passing the test on said electronic display.

2. The system according to claim 1, wherein said processing unit is further configured to display a telephone number of a service center to receive assistance with correcting the failure of the operational parameter.

3. The system according to claim 2, wherein said processing unit is further configured to access the telephone number based on the particular operational parameter that failed.

4. The system according to claim 1, wherein the operational parameter is a data communications rate.

5. The system according to claim 1, wherein said processing unit is further configured to perform multiple measurements of operational parameters in sequential order.

6. The system according to claim 5, further comprising a user interface including a start test selection element, wherein said processing unit is further configured to measure multiple operational parameters successively in response to a user selecting the start test selection element.

7. The system according to claim 1, wherein said processing unit is further configured to:

display a list of selectable work orders;

receive a selected work order; and execute at least one measurement associated with the selected work order.

8. The system according to claim 1, wherein said I/0 unit is configured to communicate over a communications line at a customer premise.

9. The system according to claim 1, wherein the operational parameters include operational parameters from multiple layers of the open system interconnection (OSI) model.

10. The system according to claim 9, wherein said processing unit is further configured to:

download updated operational parameters; and store the downloaded updated operational parameters for use in future communications line testing.

11. A method for assisting telephone service technicians in repairing communications lines, said method comprising:

storing test parameters for testing operation of a communications line;

measuring an operational parameter of communications over the communications line;

determining whether the operational parameter meets an operational criteria established by at least one of the test parameters;

storing the measured operational parameters and a test result indicator as to whether the operational parameters met the operational criteria; and if the operational parameter met the operational criteria, then displaying a pass indicator representing that the operational parameter passed a test of the operational parameter, wherein the pass indicator includes at least two of a textual indication, a graphical indicia, and values associated with measurement of the operational parameter that are simultaneously displayed;

otherwise, if the operational parameter did not meet the operational criteria, then:

displaying a fail indicator representing that the operational parameter did not pass the test on said electronic display, wherein the fail indicator includes at least two of a textual indication, a graphical indicia, and values associated with measurement of the operational parameter that are simultaneously displayed;

displaying possible causes for the operational parameter failing the test;

displaying recommendations for correcting at least one possible problem that lead to the operational parameter not passing the test.

12. The method according to claim 11, further comprising displaying a telephone number of a service center to receive assistance with correcting the failure of the operational parameter.

13. The method according to claim 12, further comprising accessing the telephone number based on the particular operational parameter that failed.

14. The method according to claim 11, wherein measuring the operational parameter includes measuring a data communications rate.

15. The method according to claim 11, further comprising performing multiple measurements of operational parameters in sequential order.

16. The method according to claim 15, further comprising measuring multiple operational parameters successively in response to a user selecting the start test selection element.

17. The method according to claim 11, further comprising:

displaying a list of selectable work orders;

receiving a selected work order; and executing at least one measurement associated with the selected work order.

18. The method according to claim 11, wherein measuring an operational parameter includes measuring an operational parameter in OSI Layer 2.

19. The method according to claim 11, wherein the operational parameters include operational parameters from multiple layers of the open system interconnection (OSI) model.

20. The method according to claim 19, further comprising:

downloading updated operational parameters; and storing the downloaded updated operational parameters for use in future communications line testing.

* * * * *